United States Patent
Honma et al.

(10) Patent No.: US 11,902,704 B2
(45) Date of Patent: Feb. 13, 2024

(54) APPARATUS AND METHOD FOR VIDEO-AUDIO PROCESSING, AND PROGRAM FOR SEPARATING AN OBJECT SOUND CORRESPONDING TO A SELECTED VIDEO OBJECT

(71) Applicant: Sony Group Corporation, Tokyo (JP)

(72) Inventors: Hiroyuki Honma, Chiba (JP); Yuki Yamamoto, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/527,578

(22) Filed: Nov. 16, 2021

(65) Prior Publication Data

US 2022/0078371 A1     Mar. 10, 2022

Related U.S. Application Data

(63) Continuation of application No. 16/303,331, filed as application No. PCT/JP2017/018499 on May 17, 2017, now Pat. No. 11,184,579.

(30) Foreign Application Priority Data

May 30, 2016  (JP) ................................ 2016-107042

(51) Int. Cl.
*H04N 19/46*   (2014.01)
*H04N 5/92*    (2006.01)
(Continued)

(52) U.S. Cl.
CPC ........... *H04N 5/9202* (2013.01); *G06V 20/46* (2022.01); *G06V 40/16* (2022.01); *G06V 40/161* (2022.01);
(Continued)

(58) Field of Classification Search
None
See application file for complete search history.

(56) References Cited

U.S. PATENT DOCUMENTS 4,653,102 A    3/1987 Hansen
5,793,875 A    8/1998 Lehr et al.
(Continued)

FOREIGN PATENT DOCUMENTS

CN      1323139 A    11/2001
CN    101727908 A     6/2010
(Continued)

OTHER PUBLICATIONS

International Search Report and English translation thereof dated Aug. 1, 2017 in connection with International Application No. PCT/JP2017/018499.
(Continued)

*Primary Examiner* — Eileen M Adams
(74) *Attorney, Agent, or Firm* — Wolf, Greenfield & Sacks, P.C.

(57) ABSTRACT

The present technique relates to an apparatus and a method for video-audio processing, and a program each of which enables a desired object sound to be more simply and accurately separated.
A video-audio processing apparatus includes a display control portion configured to cause a video object based on a video signal to be displayed; an object selecting portion configured to select the predetermined video object from the one video object or among a plurality of the video objects; and an extraction portion configured to extract an audio signal of the video object selected by the object selecting portion as an audio object signal. The present technique can be applied to a video-audio processing apparatus.

18 Claims, 14 Drawing Sheets

(51) Int. Cl.

| | | |
|---|---|---|
| *G10L 19/008* | (2013.01) | |
| *G10L 21/0272* | (2013.01) | |
| *H04R 1/40* | (2006.01) | |
| *G10L 19/00* | (2013.01) | |
| *H04R 3/00* | (2006.01) | |
| *G06V 20/40* | (2022.01) | |
| *G06V 40/16* | (2022.01) | |
| *G11B 27/30* | (2006.01) | |
| *H04N 9/802* | (2006.01) | |

(52) U.S. Cl.
CPC ............ *G10L 19/00* (2013.01); *G10L 19/008* (2013.01); *G10L 21/0272* (2013.01); *G11B 27/3081* (2013.01); *H04N 9/802* (2013.01); *H04N 19/46* (2014.11); *H04R 1/40* (2013.01); *H04R 3/00* (2013.01); *G06F 2218/22* (2023.01)

(56) References Cited

U.S. PATENT DOCUMENTS

| | | | |
|---|---|---|---|
| 8,363,848 | B2 | 1/2013 | Huang et al. |
| 8,547,416 | B2 | 10/2013 | Ozawa |
| 9,008,320 | B2 | 4/2015 | Sakagami |
| 9,247,192 | B2 | 1/2016 | Lee et al. |
| 9,330,673 | B2 | 5/2016 | Cho et al. |
| 9,621,919 | B2 | 4/2017 | Wang et al. |
| 9,729,994 | B1 | 8/2017 | Eddins et al. |
| 9,749,738 | B1 | 8/2017 | Adsumilli et al. |
| 9,756,421 | B2 | 9/2017 | Hsu et al. |
| 9,826,211 | B2 | 11/2017 | Sawa et al. |
| 10,134,414 | B1 | 11/2018 | Feng et al. |
| 10,200,804 | B2 | 2/2019 | Chen et al. |
| 10,206,030 | B2 | 2/2019 | Matsumoto et al. |
| 10,225,650 | B2 | 3/2019 | Tatematsu et al. |
| 10,635,383 | B2 | 4/2020 | Makinen et al. |
| 11,184,579 | B2 * | 11/2021 | Honma ............... G10L 21/0272 |
| 2001/0055318 | A1 | 12/2001 | Obata et al. |
| 2003/0053680 | A1 | 3/2003 | Lin et al. |
| 2004/0013038 | A1 | 1/2004 | Kajala et al. |
| 2005/0140810 | A1 | 6/2005 | Ozawa |
| 2005/0228665 | A1 | 10/2005 | Kobayashi et al. |
| 2006/0193350 | A1 | 8/2006 | Chen |
| 2009/0066798 | A1 | 3/2009 | Oku et al. |
| 2009/0154499 | A1 | 6/2009 | Yamakage et al. |
| 2009/0174805 | A1 | 7/2009 | Alberth, Jr. et al. |
| 2010/0123785 | A1 * | 5/2010 | Chen .................. H04N 23/611 |
| | | | 382/118 |
| 2010/0182501 | A1 | 7/2010 | Sato et al. |
| 2010/0254543 | A1 | 10/2010 | Kjolerbakken |
| 2010/0302401 | A1 | 12/2010 | Oku et al. |
| 2010/0315528 | A1 | 12/2010 | Goh et al. |
| 2011/0085061 | A1 | 4/2011 | Kim |
| 2011/0317023 | A1 | 12/2011 | Tsuda et al. |
| 2012/0076304 | A1 | 3/2012 | Suzuki |
| 2012/0124603 | A1 | 5/2012 | Amada |
| 2012/0155703 | A1 | 6/2012 | Hernandez-Abrego et al. |
| 2012/0163610 | A1 | 6/2012 | Sakagami |
| 2012/0218377 | A1 | 8/2012 | Oku |
| 2012/0263315 | A1 | 10/2012 | Hiroe |
| 2012/0327115 | A1 | 12/2012 | Chhetri et al. |
| 2013/0021502 | A1 | 1/2013 | Oku et al. |
| 2013/0151249 | A1 | 6/2013 | Nakadai |
| 2013/0218570 | A1 | 8/2013 | Imoto et al. |
| 2013/0272548 | A1 | 10/2013 | Visser et al. |
| 2013/0342731 | A1 | 12/2013 | Lee et al. |
| 2014/0085538 | A1 | 3/2014 | Kaine et al. |
| 2014/0086551 | A1 * | 3/2014 | Kaneko .................. H04N 25/60 |
| | | | 386/230 |
| 2014/0211969 | A1 | 7/2014 | Kim et al. |
| 2014/0233917 | A1 * | 8/2014 | Xiang ..................... H04S 3/008 |
| | | | 386/285 |
| 2014/0244880 | A1 | 8/2014 | Soffer |
| 2014/0362253 | A1 | 12/2014 | Kim et al. |
| 2015/0016641 | A1 | 1/2015 | Ugur et al. |
| 2015/0054943 | A1 | 2/2015 | Zad Issa et al. |
| 2015/0162019 | A1 | 6/2015 | An et al. |
| 2015/0237455 | A1 | 8/2015 | Mitra et al. |
| 2015/0281832 | A1 | 10/2015 | Kishimoto et al. |
| 2015/0281833 | A1 | 10/2015 | Shigenaga et al. |
| 2015/0296317 | A1 | 10/2015 | Park et al. |
| 2015/0312662 | A1 | 10/2015 | Kishimoto et al. |
| 2015/0341735 | A1 | 11/2015 | Kitazawa |
| 2016/0064000 | A1 | 3/2016 | Mizumoto et al. |
| 2016/0105478 | A1 | 4/2016 | Oyman |
| 2016/0142620 | A1 | 5/2016 | Sawa et al. |
| 2016/0234593 | A1 | 8/2016 | Matsumoto et al. |
| 2016/0249134 | A1 | 8/2016 | Wang et al. |
| 2017/0019744 | A1 | 1/2017 | Matsumoto et al. |
| 2017/0180882 | A1 | 6/2017 | Lunner et al. |
| 2017/0215005 | A1 | 7/2017 | Hsu et al. |
| 2017/0264999 | A1 | 9/2017 | Fukuda et al. |
| 2017/0364752 | A1 | 12/2017 | Zhou et al. |
| 2018/0084365 | A1 | 3/2018 | Ugur et al. |
| 2018/0158446 | A1 | 6/2018 | Miyamoto et al. |
| 2018/0270571 | A1 | 9/2018 | Di Censo et al. |
| 2018/0341455 | A1 | 11/2018 | Ivanov et al. |
| 2019/0037283 | A1 * | 1/2019 | Krauss ............... H04N 21/8586 |
| 2019/0222798 | A1 | 7/2019 | Honma et al. |

FOREIGN PATENT DOCUMENTS

| | | |
|---|---|---|
| CN | 102549655 A | 7/2012 |
| CN | 106463128 A | 2/2017 |
| JP | H11-242499 A | 9/1999 |
| JP | 2000-357000 A | 12/2000 |
| JP | 2002-185573 A | 6/2002 |
| JP | 2008-193196 A | 8/2008 |
| JP | 2008-271157 A | 11/2008 |
| JP | 2009-156888 A | 7/2009 |
| JP | 2010-193476 A | 9/2010 |
| JP | 2010-233173 A | 10/2010 |
| JP | 2011-069948 A | 4/2011 |
| JP | 2012-015651 A | 1/2012 |
| JP | 2013-106298 A | 5/2013 |
| JP | 2013-183315 A | 9/2013 |
| JP | 2013-254433 A | 12/2013 |
| JP | 2014-086551 A | 5/2014 |
| JP | 2014-207589 A | 10/2014 |
| JP | 2015-226104 A | 12/2015 |
| JP | 2016-051081 A | 4/2016 |
| KR | 20040037437 A | 5/2004 |
| KR | 20080013827 A | 2/2008 |
| KR | 2011-0121304 A | 11/2011 |
| KR | 20150117693 A | 10/2015 |
| WO | WO 2014/159272 A1 | 10/2014 |
| WO | WO 2016/138168 A1 | 9/2016 |

OTHER PUBLICATIONS

Written Opinion and English translation thereof dated Aug. 1, 2017 in connection with International Application No. PCT/JP2017/018499.

International Preliminary Report on Patentability and English translation thereof dated Dec. 13, 2018 in connection with International Application No. PCT/JP2017/018499.

Partial Supplementary European Search Report dated May 2, 2019 in connection with European Application No. 17806378.0.

Extended European Search Report dated Aug. 23, 2019 in connection with European Application No. 17806378.0.

No Author Listed, Information technology—High efficiency coding and media delivery in heterogeneous environments—Part 3: 3D audio, International Standard, ISO/IEC 23008-3, First edition Oct. 15, 2015, Corrected version Feb. 1, 2016, 439 pages.

Jurgen Herre; et al., "MPEG-H 3D Audio—The New Standard for Coding of Immersive Spatial Audio", IEEE Journal of Selected Topics in Signal Processing, vol. 9, No. 5, Aug. 1, 2015 (Aug. 1, 2015), pp. 770-779, XP055545455,US, ISSN: 1932-4553, DOI: 10.1109/JSTSP.2015.2411578.

(56) References Cited

OTHER PUBLICATIONS

Zhao Jianyong, "Digital Television Technology", Jan. 31, 2016, University of Electronic Science and Technology, Xidian University Press.
U.S. Appl. No. 16/303,331, filed Nov. 20, 2018, Honma et al.

* cited by examiner

FIG. 8

| Syntax | No. of bits | Mnemonic |
|---|---|---|
| object_metadata() { | | |
|   for ( i=0; i < num_objects; i++ ) { | | |
|     position_azimuth[i]; | 8 | tcimsbf |
|     position_elevation[i]; | 6 | tcimsbf |
|     position_radius[i]; | 4 | uimsbf |
|     gain_factor[i]; | 7 | tcimsbf |
|   } | | |
| } | | |

FIG. 9

| Syntax | No. of bits | Mnemonic |
|---|---|---|
| object_metadata() { | | |
|   for ( i=0; i < num_objects; i++ ) { | | |
|     object_priority[i]; | 3 | uimsbf |
|     position_azimuth[i]; | 8 | tcimsbf |
|     position_elevation[i]; | 6 | tcimsbf |
|     position_radius[i]; | 4 | uimsbf |
|     gain_factor[i]; | 7 | tcimsbf |
|   } | | |
| } | | |

F I G. 11

| Syntax | No. of bits | Mnemonic |
|---|---|---|
| object_metadata() { | | |
|   for ( i=0; i < num_objects; i++) { | | |
|     object_priority[i]; | 3 | uimsbf |
|     spread[i]; | 8 | tcimsbf |
|     position_azimuth[i]; | 8 | tcimsbf |
|     position_elevation[i]; | 6 | tcimsbf |
|     position_radius[i]; | 4 | uimsbf |
|     gain_factor[i]; | 7 | tcimsbf |
|   } | | |
| } | | |

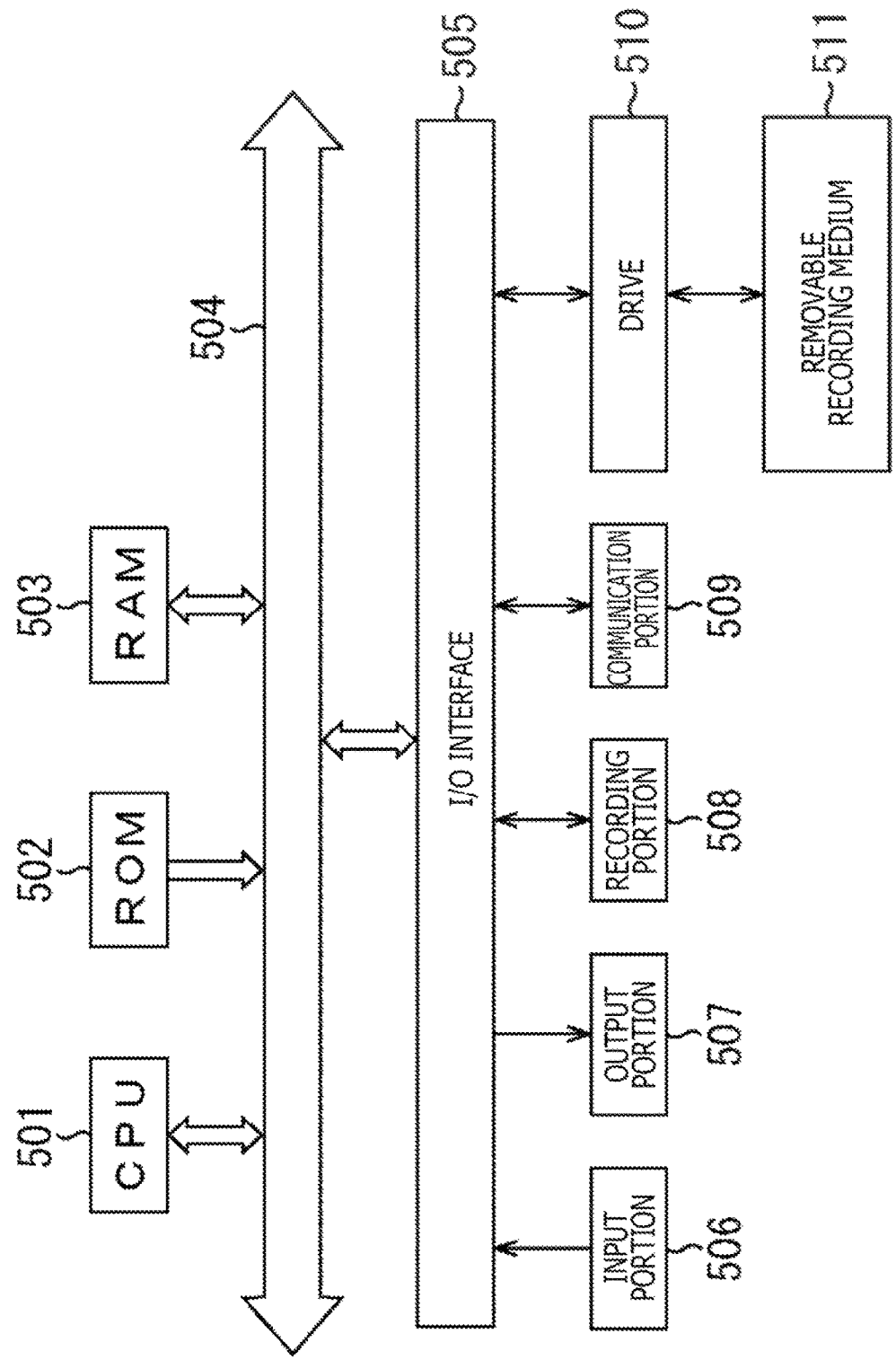

APPARATUS AND METHOD FOR VIDEO-AUDIO PROCESSING, AND PROGRAM FOR SEPARATING AN OBJECT SOUND CORRESPONDING TO A SELECTED VIDEO OBJECT

CROSS-REFERENCE TO RELATED APPLICATIONS

The present application claims the benefit under 35 U.S.C. § 120 as a continuation application of U.S. application Ser. No. 16/303,331, filed on Nov. 20, 2018, now U.S. Pat. No. 11,184,579, which claims the benefit under 35 U.S.C. § 371 as a U.S. National Stage Entry of International Application No. PCT/JP2017/018499, filed in the Japanese Patent Office as a Receiving Office on May 17, 2017, which claims priority to Japanese Patent Application Number JP2016-107042, filed in the Japanese Patent Office on May 30, 2016, each of which applications is hereby incorporated by reference in its entirety.

TECHNICAL FIELD

The present technique relates to an apparatus and a method for video-audio processing, and a program, and more particularly to an apparatus and a method for video-audio processing, and a program each of which enables a desired object sound to be more simply, and more accurately separated.

BACKGROUND ART

In recent years, an object audio technique has been used in a movie, a game or the like, and an encoding system which can deal with object audio has been developed. For example, a Moving Picture Experts Group (MPEG)-H Part 3: 3D audio standard or the like as the international standard is known as a standard about encoding of object audio (for example, refer to NPL 1).

Such an encoding system, together with a multi-channel stereo system such as the past 2 channel stereo system or a 5.1 channel in the past, can deal with a moving sound source or the like as an independent audio object, and can encode the position information associated with an audio object together with signal data of the audio object in the form of metadata. By adopting such a procedure, the processing of a specific sound source at the time of reproduction, which was difficult to carry out in the past encoding system can be readily carried out. Specifically, for example, as the processing of the specific sound source, the volume adjustment, the addition of the effect, and the like can be carried out every audio object.

If such object audio encoding is used when, for example, a moving image is photographed by using a camcorder, a smartphone or the like, then, voices of a family as the photographing target is recorded as an object sound, and a sound other than the object sound is recorded as a background sound. As a result, after the photographing, at the time of reproduction or at the time of editing, the voices of the family can be independently operated.

However, in the case where the object sound is acquired by using a mobile apparatus such as a camcorder or a smartphone, it is not easy to automatically determined what should be recorded as the object sound, and what should be recorded as the background sound in terms of the convenience of a calculation resource or a user interface.

In addition, heretofore, various sound source separation techniques have been proposed as a technique for separating the object sound. For example, there have been proposed a technique for separating a sound source by using a plurality of microphones and independent main component analysis, and the like (for example, refer to PTL 1).

CITATION LIST

Non-Patent Literature

[NPL 1]
INTERNATIONAL STANDARD ISO/IEC 23008-3 First edition 2015-10-15 Information technology—High efficiency coding and media delivery in heterogeneous environments—Part 3: 3D audio

Patent Literature

[PTL 1]
Japanese Patent Laid-Open No. 2010-233173

SUMMARY

Technical Problem

However, each of these sound source separation technique adaptively separates the sound source from the input sound signal from the microphone, and the sound other than that of the photographing target person is practically included in many cases. Therefore, the desired object sound is difficult to simply and accurately separate.

The present technique has been made in the light of such a situation, and enables the desired object sound to be more simply and accurately separated.

Solution to Problem

A video-audio processing apparatus of an aspect of the present technique is provided with a display control portion configured to cause a video object based on a video signal to be display, an object selecting portion configured to select the predetermined video object from the one video object or among a plurality of the video objects, and an extraction portion configured to extract an audio signal of the video object selected by the object selecting portion as an audio object signal.

The extraction portion can extract the audio object signal from the audio signal.

The extraction portion can extract a signal other than an audio object signal of the selected video object as a background sound signal from the audio signal.

The object selecting portion can produce object position information exhibiting a position of the selected video object on a space, and can cause the extraction portion can extract the audio object signal based on the object position information.

The extraction portion can extract the audio object signal by sound source separation using the object position information.

The extraction portion can carry out fixed beam forming as the sound source separation.

The video-audio processing apparatus can be further provided with a video object recognizing portion configured to recognize the video object based on the video signal, and the display control portion can display an image based on a recognition result of the video object together with the video object.

The video object recognizing portion can recognize the video object through face recognition.

The display control portion can display a frame as the image in an area of the video object.

The object selecting portion can select the video object in response to a selection manipulation by a user.

The object selecting portion can produce metadata of the selected video object.

The object selecting portion can produce object position information, as the metadata, indicating a position of the selected video object on a space.

The object selecting portion can produce processing priority of the selected video object as the metadata.

The object selecting portion can produce spread information exhibiting how spread an area of the selected video object as the metadata.

The video-audio processing apparatus can be further provided with an audio encoding portion configured to encode the audio object signal and the metadata.

The video-audio processing apparatus can be further provided with a video encoding portion configured to encode the video signal, and a multiplexing portion configured to multiplex a video bit stream obtained by encoding the video signal, and an audio bit stream obtained by encoding the audio object signal and the metadata.

The video-audio processing apparatus can be further provided with an image pickup portion configured to obtain the video signal by carrying out photographing.

A sound acquisition portion configured to obtain the audio signal by carrying out sound acquisition can be further provided.

A video-audio processing method or a program of the one aspect of the present technique includes: a display control step of displaying a video object based on a video signal; an object selection step of selecting the predetermined video object from the one video object or among a plurality of the video objects; and an extraction step of extracting an audio signal of the video object selected in the object selection step as an audio object signal.

In the one aspect of the present technique, the video object based on the video signal is displayed, the predetermined video object is selected from the one video object or among a plurality of the video objects, and the audio signal of the selected video object is extracted as the audio object signal.

Advantageous Effect of Invention

According to the one aspect of the present technique, the desired object sound can be more simply and accurately separated.

It should be noted that the effect described above is not necessarily limited, and any of the effects described in the present disclosure may also be available.

BRIEF DESCRIPTION OF DRAWINGS

FIG. 8 A diagram depicting syntax of metadata including the object position information.

FIG. 9 A diagram depicting syntax of metadata including processing priority.

FIG. 11 A diagram depicting syntax of metadata including spread information.

FIG. 14 A block diagram depicting an example of a configuration of a computer.

DESCRIPTION OF EMBODIMENTS

Hereinafter, embodiments to each of which the present technique is applied will be described with reference to the drawings.

First Embodiment

<Example of Configuration of Video-Audio Processing Apparatus>

With the present technique, an object recognizing technique such as a face recognizing technique with a moving image as a target is used, the recognition result is caused to be presented to an apparatus user on a display device, the apparatus user separates a sound in a direction corresponding to an object selected based on the recognition result as an object sound. In addition, a sound other than that sound is encoded by using an object audio encoding technique.

Figure 1:
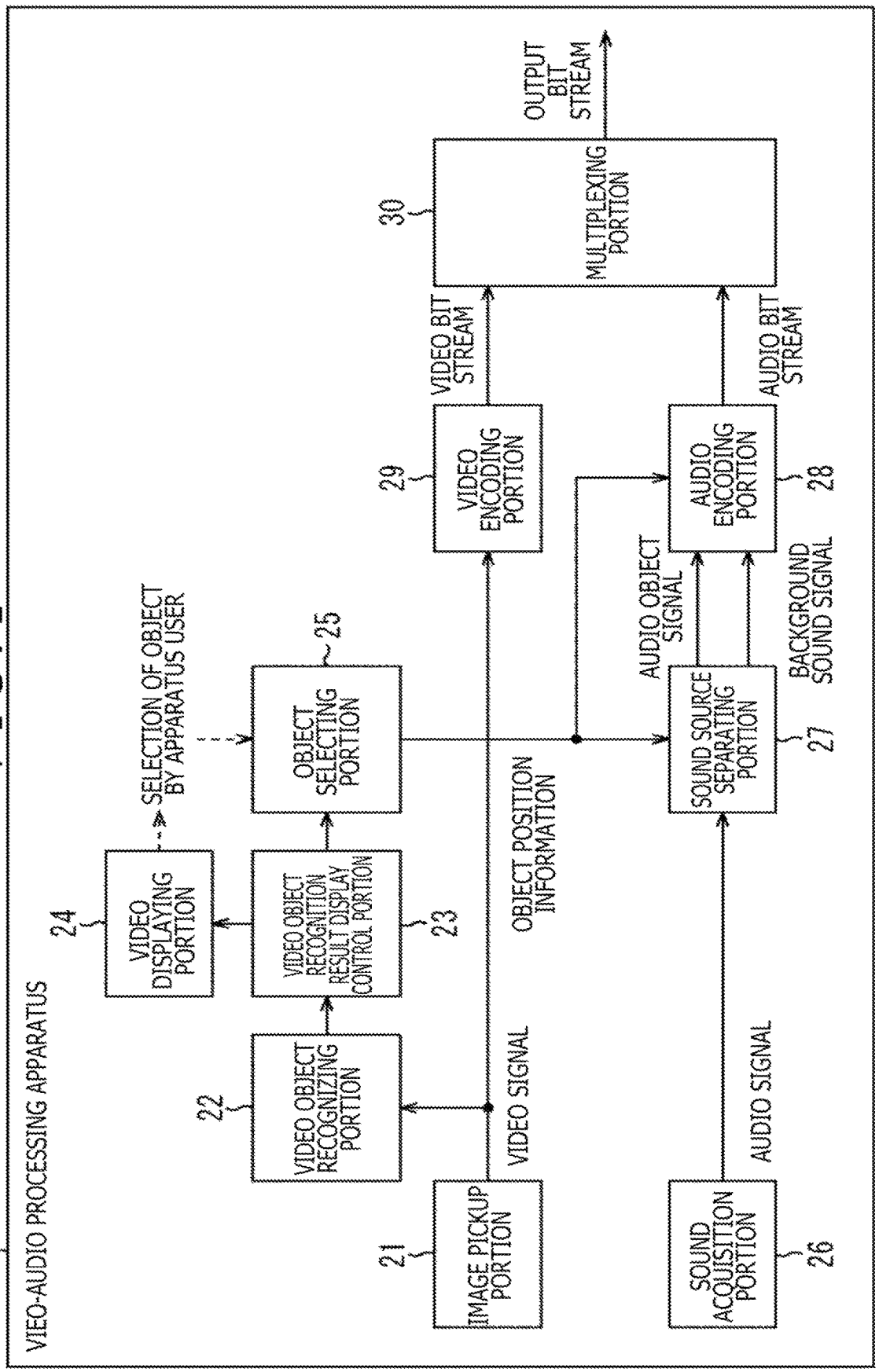
FIG. 1 A block diagram depicting an example of a configuration of a video-audio processing apparatus.

FIG. 1 is a block diagram depicting an example of a configuration of an embodiment of a video-audio processing apparatus to which the present technique is applied.

The video-audio processing apparatus 11 depicted in FIG. 1 has an image pickup portion 21, a video object recognizing portion 22, a video object recognition result display control portion 23, a video display portion 24, an object selecting portion 25, a sound acquisition portion 26, a sound source separating portion 27, an audio encoding portion 28, a video encoding portion 29, and a multiplexing portion 30.

The image pickup portion 21, for example, includes an image pickup unit including an image pickup element, a lens, and the like. The image pickup portion 21 photographs a subject, and supplies a video signal of the resulting moving image obtained as a result of the photographing to each of the video object recognizing portion 22 and the video encoding portion 29.

The video object recognizing portion 22 recognizes a video object on a moving image based on the video signal supplied thereto from the image pickup portion 21, and supplies a recognition result together with the video signal to the video object recognition result display control portion 23.

In the video object recognizing portion 22, a video object on a moving image is recognized (detected) based on face recognition, object recognition, motion capturing or the like.

For example, Japanese Patent No. 4492036 describes in detail an object recognizing technique using a known image.

Such an object recognizing technique using the known image has become realistically an available level along with the evolution of the recent machine learning technology and the cloud network. By utilizing such an object recognizing technique, an arbitrary object is recognized, the recognition result is presented to the apparatus user. As a result, the audio signal prevented from a position of an object which is selected by the apparatus user can be extracted as the signal of the audio object.

The video object recognition result display control portion 23 controls the display of the moving image in the video display portion 24 based on the recognition result of the video object, and the video signal which are supplied thereto from the video object recognizing portion 22. That is to say, the video object recognition result display control portion 23 supplies the video signal to the video display portion 24 to cause the video display portion 24 to display thereon the moving image, and superimposition-displays information indicating a position of the video object on the moving image based on the recognition result of the video object.

In addition, the video object recognition result display control portion 23 supplies the recognition result of the video object to the object selecting portion 25.

The video display portion 24, for example, includes a liquid crystal panel or the like, and displays thereon the image such as a moving image in accordance with the control made by the video object recognition result display control portion 23.

In addition, when the recognition result of the video object, in a word, the information indicating the position of the video object is displayed together with the moving image (video) on the video display portion 24, the apparatus user carries out a manipulation for specifying the desired video object. Then, a signal indicating a result of the specifying manipulation by the apparatus user is supplied to the object selecting portion 25.

The object selecting portion 25 produces object position information indicating a position, on a three-dimensional space, of the video object selected by the apparatus user based on both the recognition result of the video object supplied thereto from the video object recognition result display control portion 23, and the signal supplied thereto in response to the specifying manipulation for the video object by the apparatus user. The object selecting portion 25 supplies the resulting object position information to each of the sound source separating portion 27 and the audio encoding portion 28.

The second acquisition portion 26, for example, includes a microphone, and acquires the sound of the circumference of the video-audio processing apparatus 11, and supplies the resulting audio signal to the sound source separating portion 27. In the video-audio processing apparatus 11, the contents including the moving image photographed by the image pickup portion 21, and the voice acquired by the sound acquisition portion 26 are obtained. That is to say, the audio signal obtained in the sound acquisition portion 26 is a voice signal associated with the video signal obtained in the image pickup portion 21.

The sound source separating portion 27 carries out the sound source separation for the audio signal supplied thereto from the sound acquisition portion 26 based on the object position information supplied thereto from the object selecting portion 25.

By carrying out the sound source separation in the sound source separating portion 27, the audio signal obtained in the sound acquisition portion 26 is separated into an audio object signal as a signal of a voice of the video object selected by the apparatus user, and a signal of a voice other than the voice of the video object selected by the apparatus user, in a word, a background sound signal as a signal of the background sound. In this case, the signal of the voice of the video object selected by the apparatus user is separated (extracted) as the object sound, in a word, the audio object signal as the voice signal of the audio object.

The sound source separating portion 27 supplies the audio object signal and the background sound signal which are obtained through the sound source separation to the audio encoding portion 28.

The audio encoding portion 28 encodes the audio object signal and the background sound signal which are supplied thereto from the sound source separating portion 27, and the object position information which is supplied thereto from the object selecting portion 25, and supplies the resulting audio bit stream to the multiplexing portion 30.

The video encoding portion 29 encodes the video signal supplied thereto from the image pickup portion 21, and supplies the resulting video bit stream to the multiplexing portion 30. The multiplexing portion 30 multiplexes the video bit stream supplied thereto from the video encoding portion 29 and the audio bit stream supplied thereto from the audio encoding portion 28 to obtain an output bit stream as a final output. The multiplexing portion 30 outputs the output bit stream obtained in such a manner.

<Example of Configuration of Video-Audio Processing Apparatus>

The video-audio processing apparatus 11 depicted in FIG. 1 shows the general embodiment. Hereinafter, however, for the purpose of giving a more concrete description, a description will be given with respect to a technique for recognizing the video object in the video object recognizing portion 22 with the case where the face recognition technique is used as a concrete example.

Figure 2:
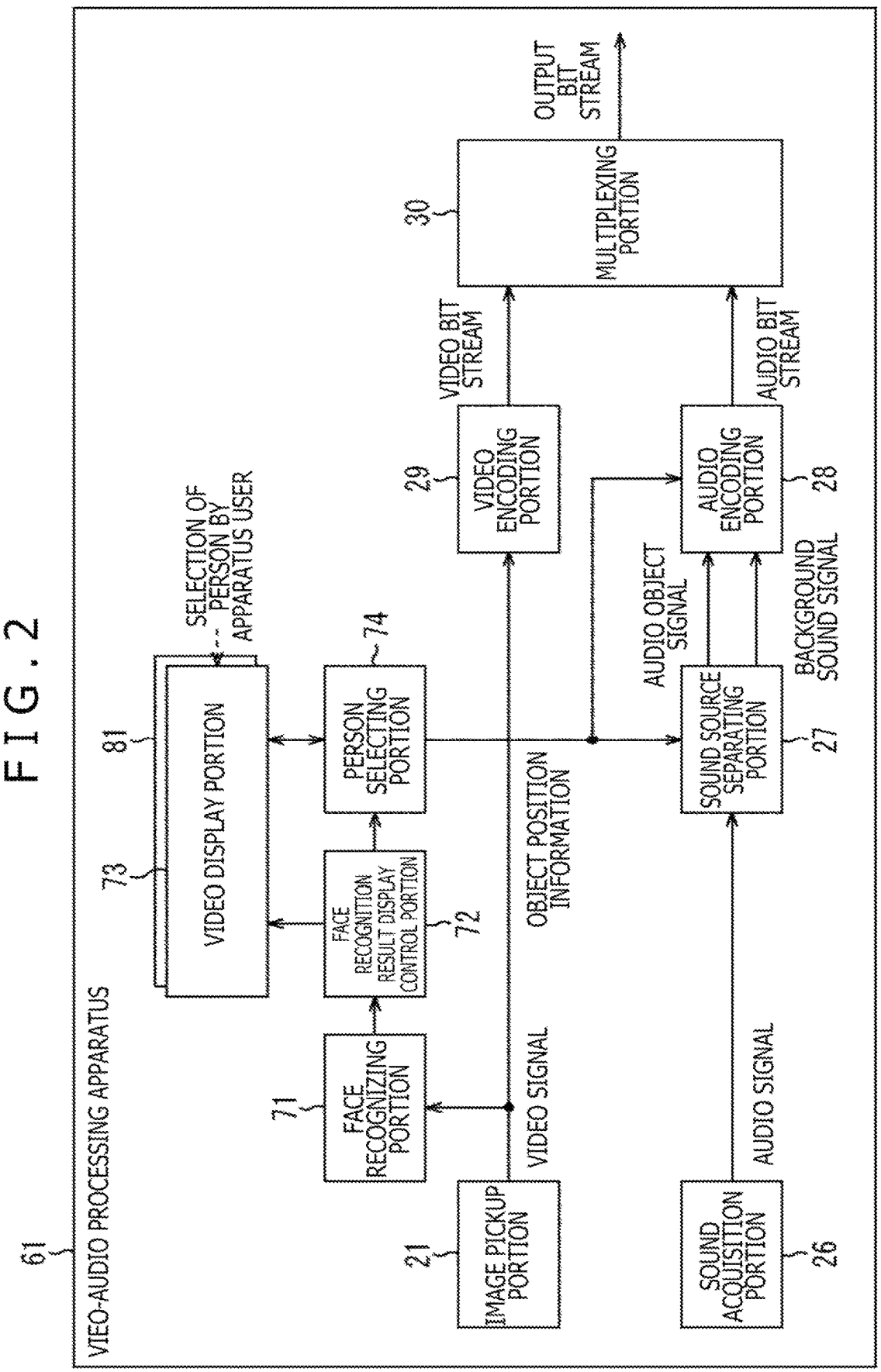
FIG. 2 A block diagram depicting a concrete example of a configuration of a video-audio processing apparatus.

In such a case, the video-audio processing apparatus 11, for example, is configured as depicted in FIG. 2. It should be noted that in FIG. 2, portions corresponding to those in case of FIG. 1 are respectively assigned the same reference numerals, and a description thereof is suitably omitted here.

The video-audio processing apparatus 61 depicted in FIG. 2 has an image pickup portion 21, a face recognizing portion 71, a face recognition result display control portion 72, a video display portion 73, a person selecting portion 74, a sound acquisition portion 26, a sound source separating portion 27, an audio encoding portion 28, a video encoding portion 29, and a multiplexing portion 30.

The configuration of the video-audio processing apparatus 61 is different from the video-audio processing apparatus 11 in that the face recognizing portion 71 to the person selecting portion 74 are provided instead of the video object recognizing portion 22 to the object selecting portion 25, and the video-audio processing apparatus 61 has the same configuration in other points as that of the video-audio processing apparatus 11.

The face recognizing portion 71 corresponds to the video object recognizing portion 22 depicted in FIG. 1. The face recognizing portion 71 executes face recognizing processing for the video signal supplied thereto from the image pickup portion 21 to recognize a face of a person on the moving image, and supplies the recognition result together with the video signal to the face recognition result display control portion 72. That is to say, in the face recognizing portion 71, a face of a person is recognized (detected) as the video object based on the video signal.

The face recognition result display control portion 72 corresponds to the video object recognition result display control portion 23 depicted in FIG. 1. The face recognition result display control portion 72 controls the display of the moving image in the video display portion 73 based on the face recognition result and the video signal which are supplied thereto from the face recognition portion 71. That is to say, the face recognition result display control portion 72 supplies the video signal to the video display portion 73 to cause the video display portion 73 to display thereon the moving image of the contents. In addition, the face recognition result display control portion 72 causes the video display portion 73 to superimposition-display thereon the information indicating the position of the person as the video object on the moving image.

In addition, the face recognition result display control portion 72 supplies the face recognition result to the person selecting portion 74.

The video display portion 73, for example, includes a liquid crystal display panel or the like, and corresponds to the video display portion 24 depicted in FIG. 1. The video display portion 73 displays thereon the image such as the moving image or the like in accordance with the control made by the face recognition result display control portion 72.

In addition, the video display portion 73 has a touch panel 81 provided through the superimposition display made on the display picture, and the touch panel 81 supplies the signal responding to a manipulation by the apparatus user to the person selecting portion 74. It should be noted that although in this case, a description will be given with respect to an example in which the apparatus user manipulates the touch panel 81, thereby carrying out the various kinds of inputs, otherwise, an input device such as a mouse, a button, a keyboard or the like may be used, thereby carrying out the input manipulation.

When the result of the face recognition, in a word, the information indicating the position of the face of the person as the video object is displayed together with the moving image (video) on the video display portion 73, the apparatus user manipulates the touch panel 81 to specify a desired person. Then, the selection result of the person (face) by the apparatus user is supplied from the touch panel 81 to the person selecting portion 74.

The person selecting portion 74 corresponds to the object selecting portion 25 depicted in FIG. 1. The person selecting portion 74 selects the person selected by the apparatus user, in a word, the video object based on the result of the face recognition supplied thereto from the face recognition result display control portion 72, and the selection result of the person supplied thereto from the touch panel 81, and produces the object position information indicating the position, on the three-dimensional space, of that video object.

In addition, the person selecting portion 74 supplies the selection result of the person by the apparatus user to the video display portion 73 and causes the video display portion 73 to display thereon the predetermined display. As a result, the person selecting portion 74 causes the selection result of the person carried out by the apparatus user by himself/herself to be enabled to be confirmed by the apparatus user.

The person selecting portion 74 supplies the object position information obtained with respect to the person selected by the apparatus user to each of the sound source separating portion 27 and the audio encoding portion 28.

<Description of Encoding Processing>

Next, an operation of the video-audio processing apparatus 61 will be described. That is to say, hereinafter, a description will be given with respect to the encoding processing executed by the video-audio processing apparatus 61 with reference to a flow chart of FIG. 3.

For example, when the video-audio processing apparatus 61 is manipulated by the apparatus user to instruct the photographing of the image with the voice as the contents, the encoding processing is started. It should be noted that although in this case, the case where the moving image (video) is photographed as the image of the contents will be described as an example, hereinafter, the moving image will be simply referred to as the image of the contents as well.

When the photographing is started, the image pickup portion 21 photographs the subject, and successively supplies the resulting video signals to each of the face recognizing portion 71 and the video encoding portion 29. In addition, the sound acquisition portion 26 acquires the voice, and successively supplies the resulting audio signals to the sound source separating portion 27.

In Step S11, the face recognizing portion 71 detects the face of the person from the image of the contents based on the video signal on the basis of the video signal supplied from the image pickup portion 21, and supplies the detection result and the video signal to the face recognition result display control portion 72.

For example, the face recognizing portion 71 executes the face recognizing processing utilizing a feature amount, a dictionary or the like for the video signal, thereby detecting the face of the person from the image. In this case, for example, the position of the face of the person on the image, the size of the area of the face of that person, and the like are recognized (detected). The person on the image of the contents, more specifically, the face of the person is set as the video object.

In Step S12, the face recognition result display control portion 72 produces a signal, for a rectangular frame image, used to display rectangular frames surrounding the respective faces on the areas of the detected faces on the image of the contents based on the detection result of the face and the video signal which are supplied thereto from the face recognizing portion 71.

It should be noted that it is only necessary that the rectangular frame image is an image in which a frame surrounding at least a part of the area is displayed in the area of the face of the person as the video object, and the entire area of the face is not necessarily surrounded by the rectangular frame.

In addition, the face recognition result display control portion 72 supplies face position information indicating a display position and a size of the rectangular frame image produced every face of the person, in a word, a position and a size of the area of the face of the person on the image to the person selecting portion 74.

In Step S13, the face recognition result display control portion 72 supplies the signal associated with the produced rectangular frame image, and the video signal of the contents to the video display portion 73. In addition, the face recognition result display control portion 72 controls the video display portion 73 in such a way that the image of the contents in which the rectangular frame image is superimposition-displayed on the area of the face of the person is displayed.

As a result, the rectangular frame image as the image based on the recognition result of the video object is displayed together with the image of the contents, in a word, the video object based on the video signal is displayed on the display picture of the video display portion 73.

By the way, with respect to the face recognition technique for detecting the face of the person from the image of the contents, the various techniques have been proposed. For example, Japanese Patent No. 4264663 (hereinafter, referred to as reference literary document 1 as well) or the like describes the face recognizing technique in detail. Reference literary document 1 describes that the face recognition is carried out, and the rectangular frame image is superimposition-displayed based on the recognition result.

The technique for the face recognizing processing in the face recognizing portion 71, or the technique for the superimposition display of the rectangular frame image by the face recognition result display control portion 72 may be considered as the similar technique to that described in reference literary document 1. However, any technique may also be available as long as the face of the person is recognized and the display surrounding the recognized face area can be carried out. In addition, although in this case, for example, an example in which the rectangular frame image is displayed is described, the display is by no means limited to the rectangular frame image, and thus the contour of the face of the person may be emphasis-displayed, or a figure image having other shape may be superimposition-displayed as long as the result of the face recognition can be displayed on the image of the contents, especially, displayed in the position of the face.

When the image of the contents is displayed on the video display portion 73 in such a manner, and the rectangular frame image is displayed in the area of the face of the person on the image of contents, the apparatus user, in a word, the user who manipulates the video-audio processing apparatus 61 manipulates a touch panel 81 to select the desired person as the audio object.

For example, the selection of the desired person is caused out by specifying the rectangular frame image displayed in the area of the face of the person concerned. In addition, the user can select only the person or can select a plurality of persons from one person or a plurality of persons (video objects) which is displayed on the video display portion 73.

In the video-audio processing apparatus 61, the voice generated from the person selected in such a manner, in a word, from the video object is set as the object sound. Then, the signal of the object sound is extracted as the audio object signal from the audio signal. Therefore, the selection of the person as the video object can be said as the manipulation for selecting the desired person as the audio object.

When the desired person is selected by the apparatus user, a signal responding to the selection manipulation by the apparatus user is supplied from the touch panel 81 to the person selecting portion 74.

In Step S14, the person selecting portion 74 selects the audio object specified by the apparatus user based on the signal, responding to the selection manipulation by the apparatus user, which is supplied from the touch panel 81, and the face position information supplied from the face recognition result display control portion 72.

In Step S15, the person selecting portion 74 controls the video display portion 73 based on the selection result of the audio object in Step S14 in such a way that the video display portion 73 is caused to highlight-display the rectangular frame image displayed in the area of the face of the person selected as the audio object, in a word, the selected rectangular frame image.

Figure 4:
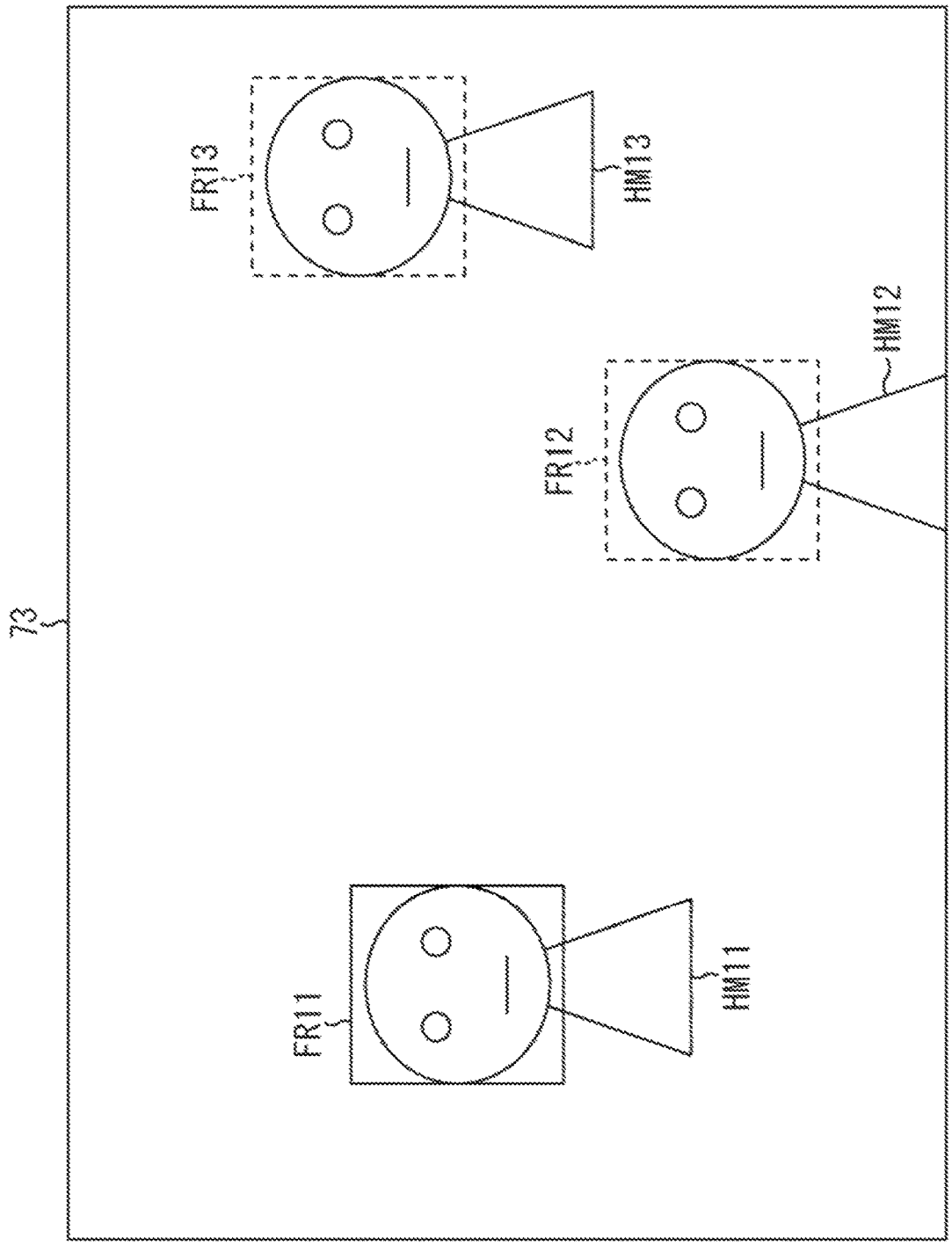
FIG. 4 A view explaining selection of an audio object, and display of a rectangular frame image.

For example, as depicted in FIG. 4, it is assumed that the image of the contents in which three persons HM11 to HM13 are included as the subjects is displayed on the video display portion 73.

In this example, in Step S11, the faces of the persons HM11 to HM13 are detected, and in Step S13, the rectangular frame image FR11 to the rectangular frame image FR13 are superimposition-displayed in the areas of the faces of these persons, respectively.

In such a state, it is assumed that the apparatus user selects the person HM11 by, for example, pressing the rectangular frame image FR11 displayed in a portion of the face area of the person HM11 with his/her figure. By carrying out the selection manipulation, in Step S14, the person HM11 the face area of which the rectangular frame image FR11 is displayed is selected as the audio object. Then, in Step S15, the rectangular frame image FR11 displayed in the face area of the selected person HM11 is highlight-displayed.

In this example, the rectangular frame image FR11 is drawn with a solid line, which represents that the rectangular frame image FR11 is highlight-displayed. On the other hand, the rectangular frame image FR12 and the rectangular frame image FR3 of the persons which are not selected are drawn with dotted lines, respectively, which represents that the rectangular frame image FR12 and the rectangular frame image FR13 are not highlight-displayed, in a word, are normally displayed.

Therefore, when the rectangular frame image FR11 is selected, the display state of the rectangular frame image FR11 is changed from a state of the normal display in which the rectangular frame image FR11 is drawn with the dotted line to a state of the highlight display in which the rectangular frame image FR11 is drawn with the solid line.

In such a manner, the rectangular frame image of the person selected by the apparatus user is displayed in a display style different from that of each of other rectangular frame images, resulting in that the apparatus user can readily confirm whether or not the selection manipulation by himself/herself is properly reflected.

It should be noted that in this case, the case where the rectangular frame image of the selected person is highlight-displayed is described as the example, the present technique is by no means limited thereto, and thus it is only necessary that the rectangular frame image of the selected person is displayed in a display style different from that of any of other rectangular frame images. For example, the rectangular frame image of the selected person may be displayed in a color or a shape different from that of any of other rectangular frame images, or may be flashing-displayed.

In addition, in the case where a dictionary of a specific person such as a family is previously held in the face recognizing portion 71, and the specific person is detected in the face recognizing portion 71, the person selecting portion 74 may select that specific person as the audio object without carrying out the selection manipulation by the apparatus user.

In such a case, information indicating the specific person is also supplied to the person selecting portion 74 through the face recognizing portion 71 to the face recognition result display control portion 72. Then, at a time point when the image of the contents, and the rectangular frame image are displayed on the video display portion 73, the video display portion 73 causes the rectangular frame image of the specific person to be highlight-displayed in accordance with the control from the person selecting portion 74.

In such a manner, the preparation is carried out in such a way that the specific person is previously selected as the audio object, resulting in that the labor of the selection manipulation by the apparatus user can be omitted. In addition, in this case, the selection of the specific person can be released in response to the later manipulation by the apparatus user.

Moreover, for the rectangular frame image which is superimposition-displayed on the image of the contents, similarly to an example, for example, described in reference literary document 1, such processing as to automatically follow a change along with a movement of a person, a movement of a photographing object area, that is, a change of the photographing direction, or the like.

Some general camcorders or digital still cameras are provided with such a mechanism as to focus on an area, of a touch panel, which is touched by the apparatus user. However, the processing for selecting the audio object, and the processing for selecting the focus target can also be executed. Similarly to the automatic following of the rectangular frame image described above, the audio object which is once selected is caused to automatically follow the change along with the movement of the person or the movement of the photographing object area.

Figure 3:
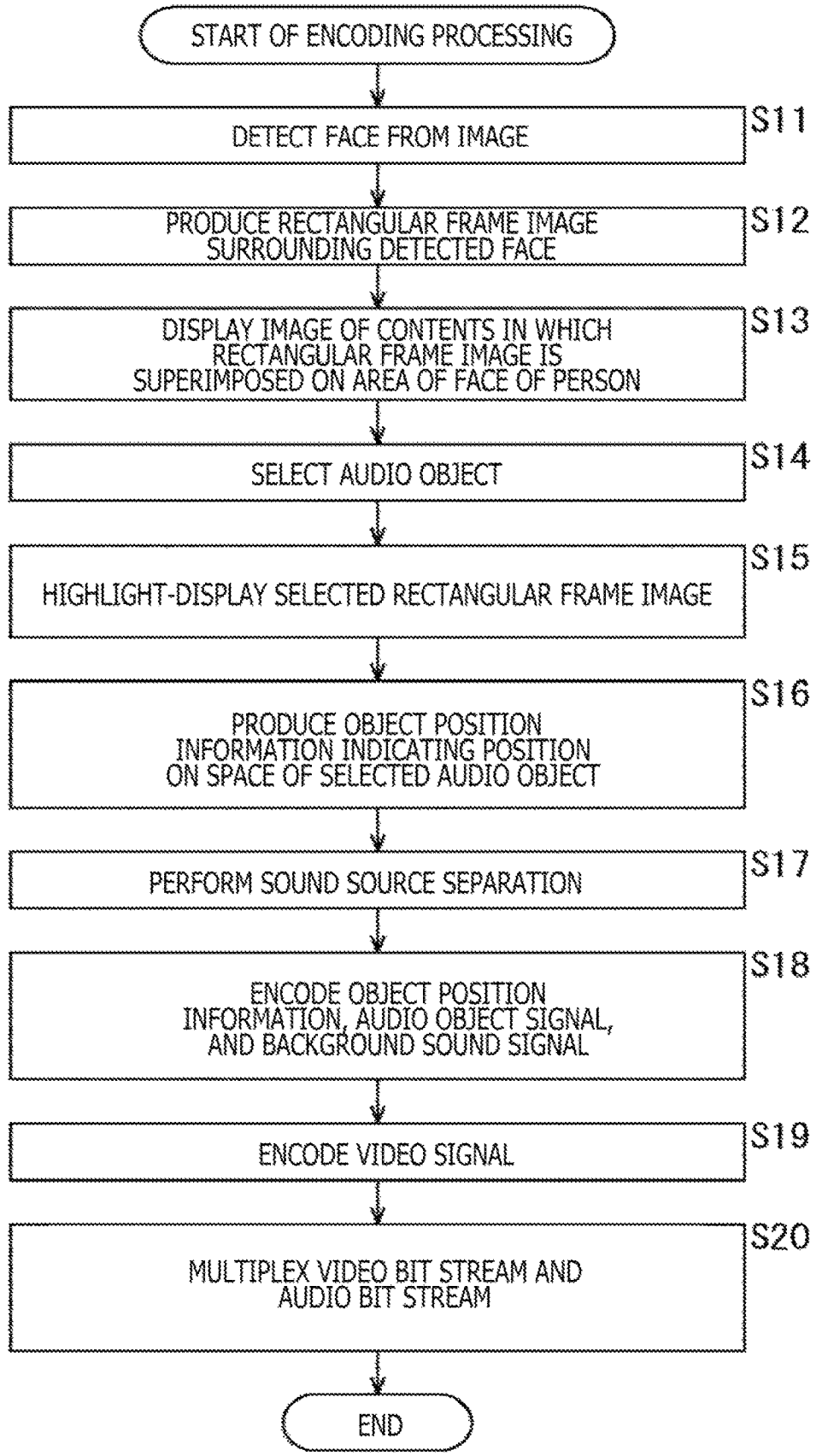
FIG. 3 A flow chart explaining encoding processing.

Return back to the description of the flow chart of FIG. 3, in Step S16, the person selecting portion 74 produces object position information indicating a position, on the space, of the audio object selected in Step S14 based on the face position information supplied thereto from the face recognition result display control portion 72.

Figure 5:
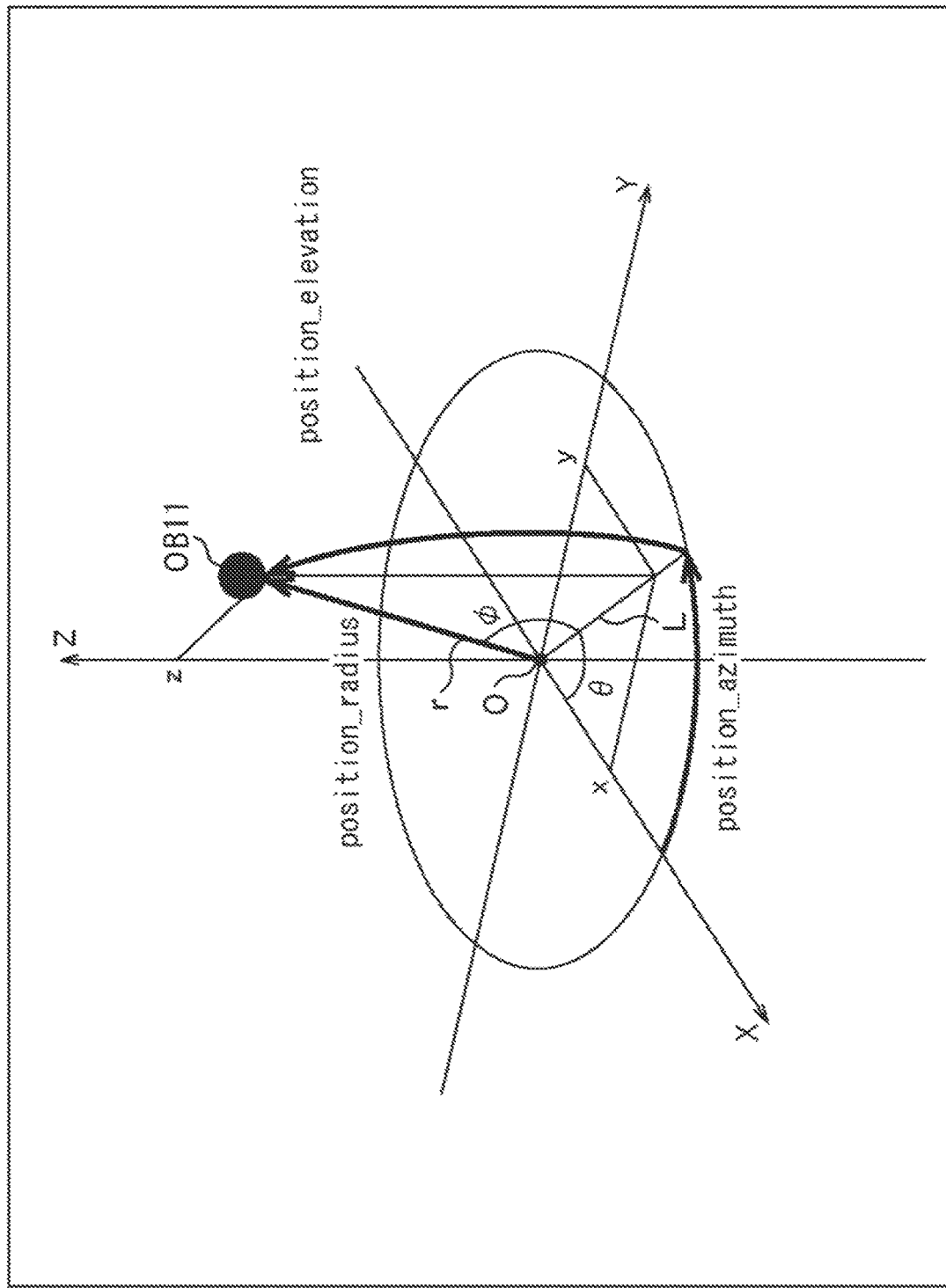
FIG. 5 A view explaining a coordinate system of object position information.

In general, the object position information associated with the audio object in the standards represented by an MPEG-H Part 3:3D audio standard or the like, for example, is encoded so as to follow the spherical coordinate system depicted in FIG. 5.

In FIG. 5, an X-axis, a Y-axis, and a Z-axis which pass through the origin O and are mutually vertical to one another are the axes of the three-dimensional orthogonal coordinate system. For example, in the three-dimensional orthogonal coordinate system, for the position of the audio object OB11 on the space, there are used x as the X-coordinate indicating a position in the X-axis direction, y as a Y-coordinate indicating a position in the Y-axis direction, and z as a Z-coordinate indicating a position in the Z-axis direction. As a result, the position of the audio object OB11 is reproduced in the form of (x, y, z).

On the other hand, in the spherical coordinate system, an azimuth, an elevation angle, and a radius are used, thereby representing the position of the audio object OB11 on the space.

Now, a straight line connecting the origin O and the position of the audio object OB11 is assigned a straight line r, and a straight line which is obtained by projecting the straight line r on an XY plane is assigned a straight line L.

At this time, an angle θ between the X-axis and the straight line L is the azimuth indicating the position of the audio object OB11. In addition, an angle Φ between straight line r and the XY plane is the elevation angle indicating the position of the audio object OB11, and a length of the straight line r is a radius indicating the position of the audio object OB11.

In the following, the position of the audio object on the space is expressed by the spherical coordinate system. In this case, the azimuth, the elevation angle, and the radius indicating that position are respectively described as position_azimuth, position_elevation, and position_radius.

In general, it is difficult to measure a size of an object from a moving image, or an actual distance from a photographer. In addition, in the image pickup apparatus such as the camcorder, the image pickup apparatus which can measure a distance to an object such as an auto-focusing mechanism is present. In this case, however, in the case where a position of a subject, in a word, a position of an audio object on the real space is calculated using the face recognizing processing will be described as an example.

That is to say, hereinafter, a description will be given with respect to a method of measuring a subject distance in the case where in a general image pickup apparatus, a shape of a subject is known with reference to FIG. 6.

Figure 6:
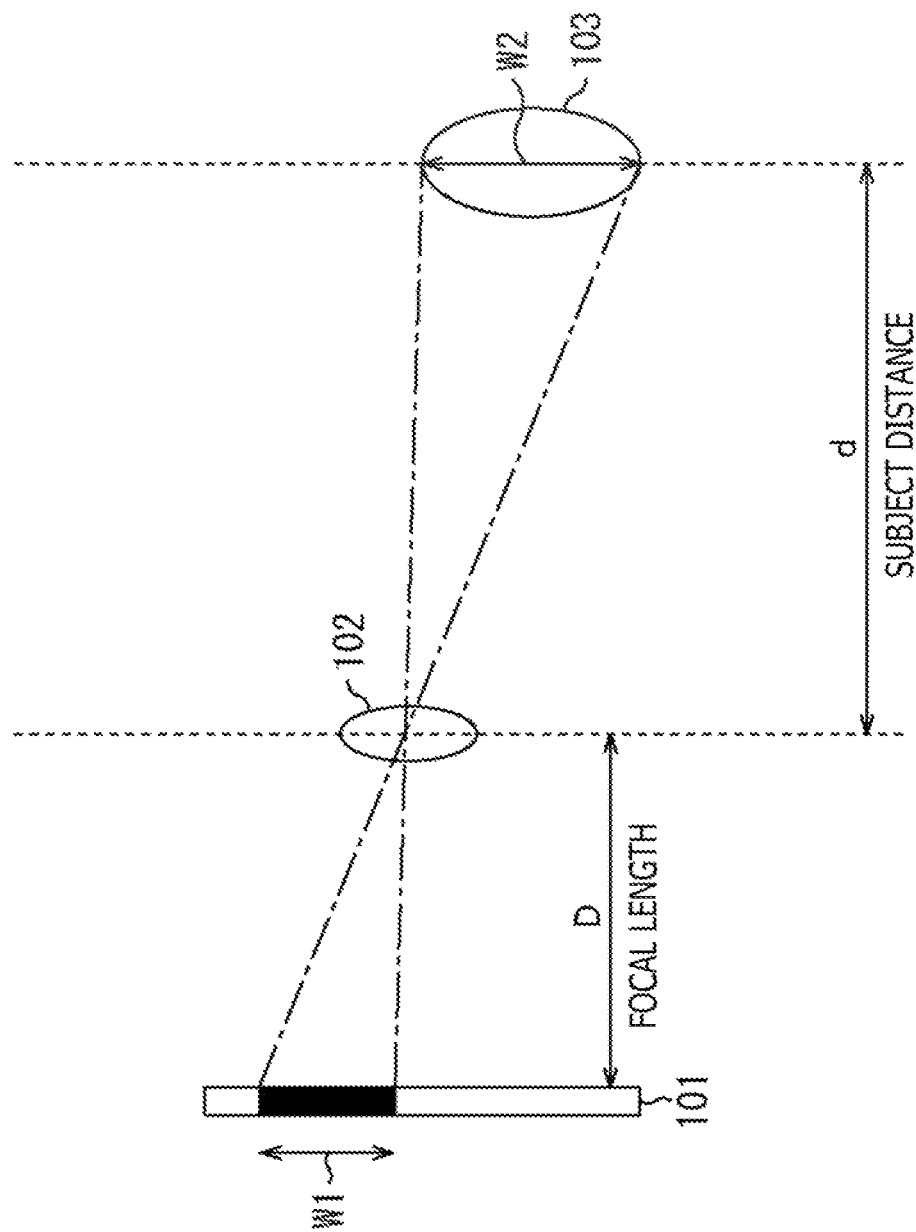
FIG. 6 A view explaining a relationship among a subject, a lens, and an imaging surface.

In FIG. 6, a subject 103 is photographed by an image pickup unit including an image pickup element having an imaging surface 101, and a lens 102. Here, the image pickup unit including the image pickup element and the lens 102 corresponds to the image pickup portion 21. The subject 103 is a person, on the real space, corresponding to the person, on the image, which is selected as the audio object in Step S14.

In this example, in the figure of the subject 103, a subject width as a width in the longitudinal direction is W2, and in the figure of the image of the subject 103 on the imaging surface 101 when the subject 103 is photographed, a photographed subject width as a width in a longitudinal is W1.

Moreover, a distance in a transverse direction, in the figure, on the space, from the lens 102 to the subject 103 is assigned a subject distance d, and a distance in the transverse direction, in the figure on the space, from the imaging surface 101 to the lens 102 is assigned a focal length D.

It should be noted that more specifically, a distance in the transverse direction, in the figure, from a principal point of the lens 102 to the subject 103 is a subject distance d, and a distance in the transverse direction, in the figure, from the imaging surface 101 to the principal point of the lens 102 is the focal length D. In addition, when the lens 102 includes a plurality of lenses, a principal point of a complex lens becomes the principal point of the lens 102.

In the person selecting portion 74, the information, associated with the image pickup portion 21, such as the focal length D, and the size, the number of pixels, and the like of the imaging surface 101 is previously held.

In addition, the person selecting portion 74 can specify a relationship between the person and the size of the subject on the image, and the position and the size of (image of) the subject on the imaging surface 101 from the face position information supplied thereto from the face recognition result display control portion 72, and the information, associated with the image pickup portion 21, which is previously held. Therefore, the person selecting portion 74 can obtain the imaged subject width W1 from the face position information and the information associated with the image pickup portion 21.

The person selecting portion 74 calculates following Expression (1) based on the focal distance D as the known physical amount, the imaged subject width W1, and the subject width W2 which are the known physical amounts, and calculate the subject distance d as an unknown physical amount.

[Expression]

$$d = \frac{W2}{W1} \cdot D \tag{1}$$

It should be noted that although the subject width W2 is strictly the unknown physical amount, the dispersion of the sizes of the faces of the individual human beings is regarded as being much smaller than the subject distance d, and thus the size of the face of the average human being can be used as the subject width W2. That is to say, the subject width W2 can be regarded as the known physical amount.

For example, since the width of the face of the human being is approximately 16 cm in average value, and the length of the face is approximately 23.5 cm in average value, these values can be used as the subject width. The average values of the face widths and the lengths of the surfaces are slightly changed depending on a difference between men and women, age, and the like. However, since the sex and approximate age of the detected person can be estimated from the face detected from the image of the contents through the image recognition or the like, the subject width may be corrected by using the sex or the average value by age.

In addition, one of the width (length) in the longitudinal direction, and the width in the transverse direction of the person as the subject, or both the width in the longitudinal direction, and the width in the transverse direction of the person as the subject can be used in calculating the subject distance d. In this case, for the sake of simplicity of the description, the case where the width in the longitudinal direction of the face of the person is used as the subject width W2, and only the subject width W2 is used to calculate the subject distance d will be described as an example.

In FIG. 6, the position of the principal point of the lens 102 corresponds to the origin O depicted in FIG. 5, and the longitudinal direction and the transverse direction in FIG. 6 correspond to the Z-axis direction and the X-axis direction in FIG. 5, respectively. In particular, in FIG. 6, the right direction corresponds to the front direction in FIG. 5, in a word, the positive direction of the X-axis direction.

Therefore, the subject distance d calculated from the above calculation indicates a distance to the person selected as the audio object in the X-axis direction when viewed from the origin O in the three-dimensional orthogonal coordinate system depicted in FIG. 5.

Moreover, similarly, the position of the face of the person selected as the audio object on the space can also be obtained by using the average size of the face as the known physical amount.

Figure 7:
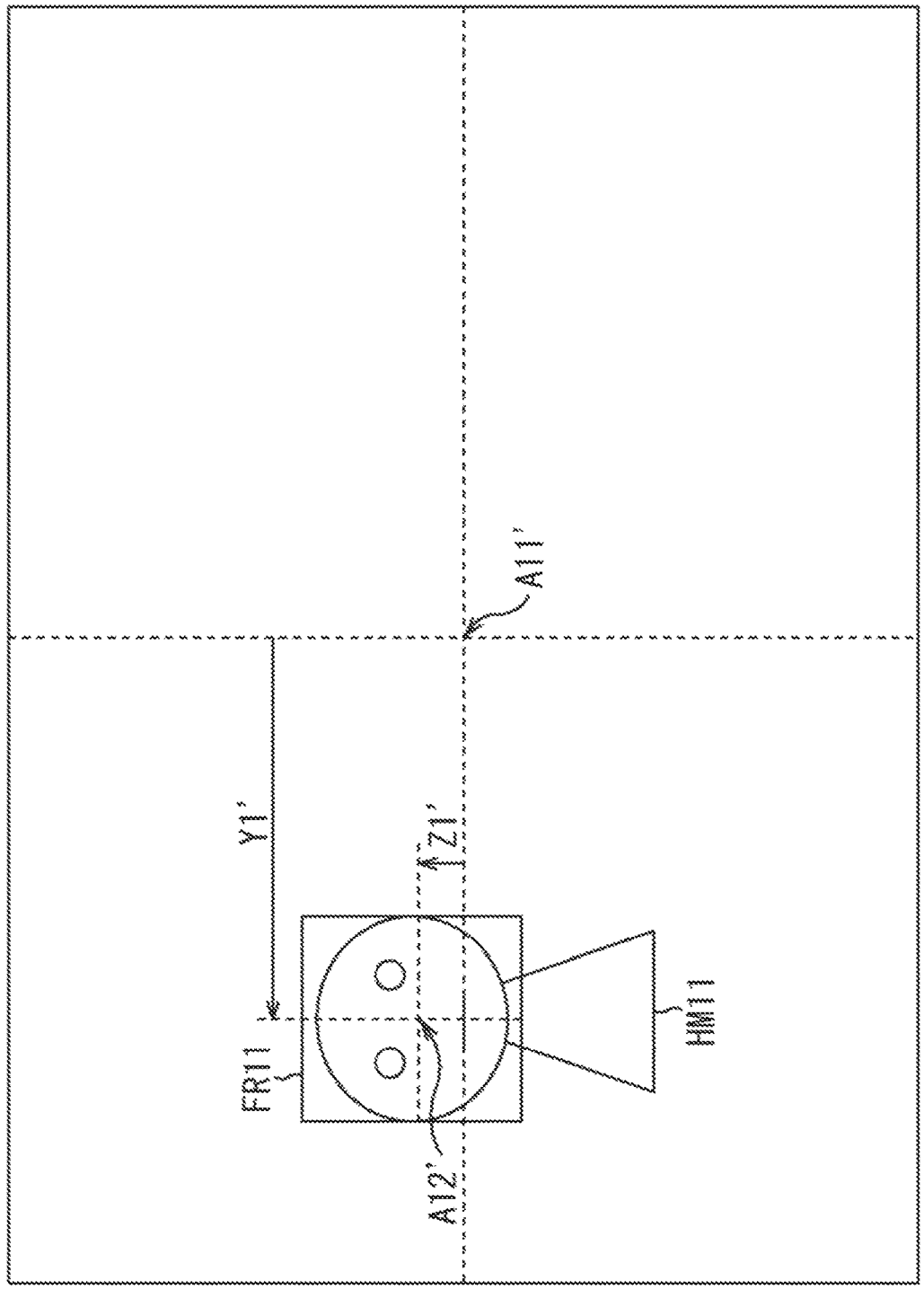
FIG. 7 A view explaining calculation of the object position information.

For example, it is assumed that the person HM11 is selected as the audio object on the image of the contents displayed on the video display portion 73 as depicted in FIG. 7, and the rectangular frame image FR11 surrounding the area of the face of the person HM11 is superimposition-displayed. It should be noted that in FIG. 7 portions corresponding to those in case of FIG. 4 are respectively assigned the same reference numerals, and a description thereof is suitably omitted here.

In FIG. 7, the head portion of the person HM11 selected as the audio object corresponds to the subject 103 depicted in FIG. 6.

In FIG. 7, a central position of the image of the contents is assigned a position A11', and a central position of the rectangular frame image FR11 displayed with respect to the person HM11 is assigned a position A12. For example, the person selecting portion 74 can obtain a position A12' from the face position information supplied thereto from the face recognition result display control portion 72.

Now, the longitudinal direction and the transverse direction in the figure on the image of the contents are assigned the Z-axis direction (Z direction) and the Y-axis direction (Y direction), respectively. In addition, a position of the position A12' in the Y-axis direction when viewed from the position A11' on the image of the contents is assigned an image subject horizontal position Y1', and a position of the position A12' in the Z-axis direction when viewed from the position A11' is assigned an image subject vertical position Z1'.

On the other hand, a central position on the imaging surface 101 is assigned a position A11 and a position corresponding to the position A12' on the imaging surface 101 is assigned a position A12. Moreover, a position of the position A12 in the Y-axis direction when viewed from the position A11 on the imaging surface 101 is assigned an imaging surface subject horizontal position Y1, and a position of the position A12 in the Z-axis direction when viewed from the position A11 on the imaging surface 101 is assigned an imaging surface subject vertical position Z1.

Here, the Y-axis direction and the Z-axis direction on the imaging surface 101 are the front direction and the vertical direction in FIG. 6, respectively. Since the person selecting portion 74 can obtain the position A12' from the face position information supplied thereto from the face recognition result display control portion 72, the person selecting portion 74 can obtain the image subject horizontal position Y1' and the image subject vertical position Z1' from the position A12'.

Moreover, since the person selecting portion 74 previously holds the information indicating the size of the imaging surface 101 as the known information, the person selecting portion 74 can obtain the imaging surface subject horizontal position Y1 and the imaging surface subject vertical position Z1 from the image subject horizontal position Y1' and the image subject vertical position Z1'. In a word, the imaging surface subject horizontal position Y1 and the imaging surface subject vertical position Z1 become the known physical amounts.

Therefore, the person selecting portion 74 can obtain the position in the Y-axis direction and in the Z-axis direction of the subject 103 on the space, in a word, the person HM11 from the imaging surface subject horizontal position Y1 and the imaging surface subject vertical position Z1, and the imaged subject width W1 and subject width W2 described above.

Here, positions in the Y-axis direction and in the Z-axis direction on the space of the subject 103, in a word, the face of the person are assigned the subject horizontal position y and the subject vertical portion z, respectively. At this time, the subject horizontal position y and the subject vertical portion z can be obtained from the imaging surface subject horizontal position Y1 and the imaging surface subject vertical position Z1, and the imaged subject width W1 and the subject width W2 by calculating following Expression (2) and Expression (3).

[Expression 2]
$$y = \frac{W2}{W1} \cdot Y1 \qquad (2)$$

[Expression 3]
$$Z = \frac{W2}{W1} \cdot Z1 \qquad (3)$$

The person selecting portion 74 obtains the subject horizontal position y and the subject vertical position z of the face of the person selected as the audio object on the actual space by calculating Expression (2) and Expression (3).

Moreover, the person selecting portion 74 calculates following Expressions (4) to (6) based on the subject horizontal position y and the subject vertical position z obtained in such a manner, and the subject distance d described above, and calculates the position, in the spherical coordinate system, of the face of the actual person.

[Expression 4]

$$\text{position\_radius} = \sqrt{d^2+y^2+z^2} \quad (4)$$

[Expression 5]

$$\text{position\_azimuth} = a\tan 2(y,d) \quad (4)$$

[Expression 6]

$$\text{position\_elevation} = \sin^{-1}\left(\frac{z}{\sqrt{d^2+y^2+z^2}}\right) \quad (6)$$

That is to say, the radius position_radius indicating the position, on the space, of the person selected as the audio object can be obtained from the calculation of Expression (4).

In addition, the azimuth position_azimuth indicating the position, on the space, of the person selected as the audio object can be obtained from the calculation of Expression (5). Moreover, the elevation angle position_elevation on the space of the person selected as the audio object can be obtained from the calculation of Expression (6).

Here, a tan 2(y, d) in Expression (5) is defined from following Expression (7).

[Expression 7]

$$\text{atan2}(y,d) = \begin{cases} \tan^{-1}\left(\frac{y}{d}\right), & d > 0 \\ \tan^{-1}\left(\frac{y}{d}\right) + \pi, & y \geq 0, d < 0 \\ \tan^{-1}\left(\frac{y}{d}\right) - \pi, & y < 0, d < 0 \end{cases} \quad (7)$$

However, it is assumed that the subject distance d, as depicted in following Expression (8), is limited by a minimum value $d_{min}$. That is to say, when an absolute value of the subject distance d obtained from Expression (1) is smaller than the minimum value $d_{min}$, the person selecting portion 74 uses the minimum value $d_{min}$ as the value of the subject distance d.

[Expression 8]

$$|d| \geq d_{min} \quad (8)$$

The person selecting portion 74 sets the information indicating the position, on the space, of the person selected as the audio object as the object position information. In this case, the position, on the space, of the person selected as the audio object is expressed by the azimuth position_azimuth, the elevation angle position_elevation, and the radius position_radius which are obtained from the processing described above.

In such a manner, the person selecting portion 74 can obtain the object position information based on the result of the face recognition in the face recognizing portion 71. However, in general, in the image pickup portion 21, a change of the light is generated, and micro vibration is generated by the shake or the like. Therefore, it is desirable to carry out the smoothing for the object position information by using a filter or the like.

The person selecting portion 74 supplies the object position information thus obtained to each of the sound source separating portion 27 and the audio encoding portion 28, and the processing proceeds to Step S17. It should be noted that in the case where a plurality of audio objects is selected in the pieces of processing described above, the object position information is produced every audio object.

In Step S17, the sound source separating portion 27 carries out the sound source separation for the audio signal supplied thereto from the sound acquisition portion 26 based on the object position information supplied thereto from the person selecting portion 74, thereby separating the audio signal into the audio object signal and the background sound signal.

For example, in this case, the position of the audio object on the space, in a word, a sound source position is a position indicated by the object position information and thus known.

Then, for example, the sound source separating portion 27 separates the audio signal into the audio object signal as the signal of the audio object, and the background sound signal as the signal of the sound source other than the audio object by using a fixed beam forming technique.

Specifically, in the case where, for example, the sound acquisition portion 26 is a microphone array including a plurality of microphones, the control of the directivity is carried out for the audio signal obtained in the sound acquisition portion 26, thereby enabling the audio object signal and the background sound signal to be separated from the audio signal. In a word, the audio object signal and the background sound signal can be extracted from the audio signal.

In other words, with the fixed beam forming, the signal of the voice in the position of the video object selected as the audio project on the space is extracted as the audio object signal from the audio signal. More specifically, the signal of the voice coming from a certain direction of the video object selected as the audio object on the space is extracted as the audio object signal from the audio signal. Then, the signal of the voice other than the voice of the audio object is extracted as the background sound signal from the audio signal.

It should be noted that the technique for the sound source separation in the sound source separating portion 27 is by no means limited to the fixed beam forming, and any technique such as use of the technique described in Japanese Patent Laid-Open No. 2010-233173 may be adopted.

In addition, in this case, although the description has been given on the assumption that the video-audio processing apparatus 61 is the portable type apparatus such as the camcorder, the present technique is by no means limited thereto, and can also be applied to a system having a large scale to certain degree such as a television conference system or studio recording. In such a case, if a large scale microphone array is used as the sound acquisition portion 26, then, the separation performance for the sound source can be enhanced.

In addition, for example, a plurality of microphones including a directional microphone may be used as the sound acquisition portion 26. In such a case, the sound source separating portion 27 changes a direction of the directional microphone to a direction indicated by the object position information, resulting in that the audio object signal can be obtained from the directional microphone, and the background sound signal can be obtained from other microphones. That is to say, the audio object signal can be extracted by the directional microphone, and the background sound signal can be extracted by other microphones.

In Step S18, the audio encoding portion 28 encodes the object position information supplied thereto from the person selecting portion 74, and the audio object signal and background sound signal supplied thereto from the sound source separating portion 27. Then, the audio encoding portion 28 supplies the resulting audio bit stream to the multiplexing portion 30.

For example, after the audio object signal and the background sound signal are encoded independently of each other, they are multiplexed to produce the audio bit stream.

For example, a linear Pulse Code Modulation (PCM) system, or an irreversible compression system as described in "INTERNATIONAL STANDARD ISO/IEC 23008-3 First edition 2015-10-15 Information technology—High efficiency coding and media delivery in heterogeneous environments—Part 3: 3D audio" (hereinafter, referred to as reference literary document 2 as well) may be used as the encoding system for the audio object signal and the background sound signal.

In addition, the object position information is generally data called metadata, and is encoded in the format, for example, as depicted in FIG. 8 every predetermined time interval.

FIG. 8 is a view depicting an example of syntax (encoded format) of the metadata including the object position information. In the metadata depicted in FIG. 8, "num_objects" indicates the number of audio objects included in the audio bit stream.

In addition, "tcimsbf" is an abbreviation of "Two's complement integer, most signification (sign) bit first," and the encoded bit indicates a complement of 2 of the head. "uimsbf" is an abbreviation of "Unsigned integer, most significant bit first" and the most significant bit indicates an unsigned integer of the head.

Moreover, "position_azimuth [i]," "position_elevation [i]," and "position_radius [i]" respectively indicate the object position information of the i-th audio object included in the audio bit stream.

Specifically, "position_azimuth [i]" indicates the azimuth position_azimuth of the position of the audio object in the spherical coordinate system, and "position_elevation [i]" indicates the elevation angle position_elevation of the position of the audio object in the spherical coordinate system. In addition, "position_radius [i]" indicates a distance to the position of the audio object in the spherical coordinate system, that is, the radius position_radius.

In addition, "gain_factor[i]" indicates gain information of the i-th audio object included in the audio bit stream.

In such a manner, the person selecting portion 74 produces the object position information set as the metadata of the audio object. The audio encoding portion 28 encodes the object position information and the gain information as the metadata.

Return back to the description of the flow chart of FIG. 3, in Step S19, the video encoding portion 29 encodes the video signal supplied thereto from the image pickup portion 21, and supplies the resulting video bit stream to the multiplexing portion 30.

It should be noted that in the system for encoding the video signal, various video encoding systems can be used in addition to the well-known video encoding system such as MPEG-HEVC or MPEG-AVC.

In Step S20, the multiplexing portion 30 multiplexes the video bit stream supplied thereto from the video encoding portion 29, and the audio bit stream supplied thereto from the audio encoding portion 28 together with system information used to carry out the synchronization of them, and the like to produce an output bit stream. The multiplexing portion 30 outputs the resulting output bit stream, and the encoding processing is ended.

In the manner as described above, the video-audio processing apparatus 61 carries out the face recognition for the video signal, and causes the rectangular frame image indicating the result of the face recognition to be displayed together with the image of the contents. In addition, the video-audio processing apparatus 61 selects the audio object in response to the selection manipulation made by the apparatus user, and produces the object position information of the audio object.

As a result, the signal of the desired object sound can be separated more simply and accurately. That is to say, the apparatus user can select simply and intuitively which of the video objects (subjects) on the image of the contents is selected as the audio object while he/she views the display on the video display portion 73. Moreover, the signal of the desired audio object can be separated more accurately by obtaining the object position information of the selected audio object.

If the voice of the person selected in such a manner is encoded as the audio object signal, then, at the time of the reproduction, the volume of the voice, the sound source position, the sound quality, and the like can be changed every audio object.

By the way, in the description which has been given so far, the example in which while the video-audio processing apparatus 61 photographs the image of the contents, the apparatus user selects the person who is desired to be made the audio object has been described. However, after the photographing, the person who is desired to be made the audio object may be selected.

In such a case, at the time of the photographing of the image of the contents, for example, the video signal obtained through the photographing, and the audio signal obtained through the sound acquisition are recorded without being encoded. Then, after the photographing, when the reproduction of the contents is instructed, the contents are reproduced based on the video signal and the audio signal, and the encoding processing described with reference to FIG. 3 is executed.

Next, a description will now be given with respect to a method of receiving the output bit stream obtained from the above processing, and carrying out the reproduction of the contents, especially, the reproduction of the voice of the contents.

With regard to the background sound signal included in the audio bit stream obtained by non-multiplexing the output bit stream, for example, the reproduction is carried out in accordance with the so-called multi-channel stereo system such as the past 2-channel or 5.1-channel in the past.

On the other hand, with regard to the audio object signal, reference literary document 2 describes a rendering system for the audio object, and the rendering is carried out in accordance with the rendering system to carry out the reproduction.

More specifically, the audio object signal is mapped and reproduced in a speaker of the reproduction environment in accordance with a system called Vector Base Amplitude Panning (VBAP).

This is a technique for localizing a sound in a position, on a space, of the audio object by using outputs from three speakers closest to the position, on the space, of the audio object indicated by the object position information. Although in reference literary document 2, the number of speakers is three, of cause, the sound can also be localized by four or more speakers.

In addition, in the foregoing, the example in which the background sound signal is encoded and decoded in accordance with the multi-channel stereo system has been described. However, a system such that the space close to a viewer which is called Higher Order Ambisonic (HOA) described in the standard in reference literary document 2 is expressed with spherical harmonics as orthogonal basis may also be used.

Moreover, in the first embodiment, the apparatus user, that is, the photographer carries out the photographing in such a way that a person to be photographed becomes the object of the audio object extraction usually falls within the screen in most cases. However, as the measures taken for the case where the person selected as the audio object moves beyond the screen, the object position information may be produced by using the generally known speaker identification technique or the like.

Second Embodiment

<With Respect to Processing Priority of Audio Object>

In the first embodiment described above, the apparatus user carries out the manipulation for selecting the person the voice of which is desired to be acquired as the audio object from the candidates displayed on the video display portion 73.

It may be impossible to execute the decoding processing and the rendering processing of all the audio object signals as a matter of convenience of the calculation throughput depending on the apparatus for decoding the output bit stream obtained in the video-audio processing apparatus 61 to reproduce the contents in some cases.

Now, a technique for adding the processing priority "priority" as the metadata within the bit stream every audio object on the encoding device side is proposed and this technique is adopted in the standard as well of reference literary document 2.

Then, in the second embodiment to which the present technique is applied, the apparatus user can select a person a voice of whom is desired to be acquired as the audio object from the candidates displayed on the video display portion 73, and can set the processing priority of the selected person.

In this case, the metadata in which the object position information is stored, for example, is as depicted in FIG. 9. FIG. 9 is a diagram depicting an example of syntax of the metadata.

In addition to the pieces of information included in the metadata depicted in FIG. 9, the information associated with the processing priority "objecft_priority[i]" of the i-th audio object, in a word, the audio object signal is further included in the metadata depicted in FIG. 8.

In this example, the information associated with the processing priority "objecft_priority[i]" is set as the data of 3 bits, and can take a value from 0 to 7.

For example, in the case where the value of the processing priority objecft_priority[i] is 0, the processing priority of the audio object is lowest, and in the case where the value of the processing priority objecft_priority[i] is 7, the processing priority of the audio object is highest.

Now, it is assumed that, for example, the output bit stream including the audio object signals of the three audio objects in which when the values of the processing priority object_priority[i] are 7, 3 and 0, respectively, is supplied to the apparatus on the reproduction side. In addition, it may be impossible for the apparatus on the reproduction side to carry out the rendering of all the three audio objects.

In such a case, for example, with respect to the audio object in which the value of the processing priority object_priority[i] is 0, the apparatus on the reproduction side can carry out the simple rendering in which the sound quality is sacrificed, or disables the rendering of that audio object. As a result, even the reproduction apparatus having the low throughput can realize the real-time reproduction of the contents.

As described above, in the case where the information associated with the processing priority is stored together with the object position information in the metadata, the person selecting portion 74 of the video-audio processing apparatus 61 selects the person whom is desired to be set as the audio object and carries out the setting of the processing priority based on the signal, responding to the manipulation made by the apparatus user, which is supplied from the touch panel 81. Then, the person selecting portion 74 supplies the object position information to each of the sound source separating portion 27 and the audio encoding portion 28, and supplies the information associated with the resulting processing priority to the audio encoding portion 28.

As a result, the audio encoding portion 28 encodes not only the object position information, but also the information associated with the processing priority to produce the audio bit stream in which the metadata including the object position information and the information associated with the processing priority is stored.

Figure 10:
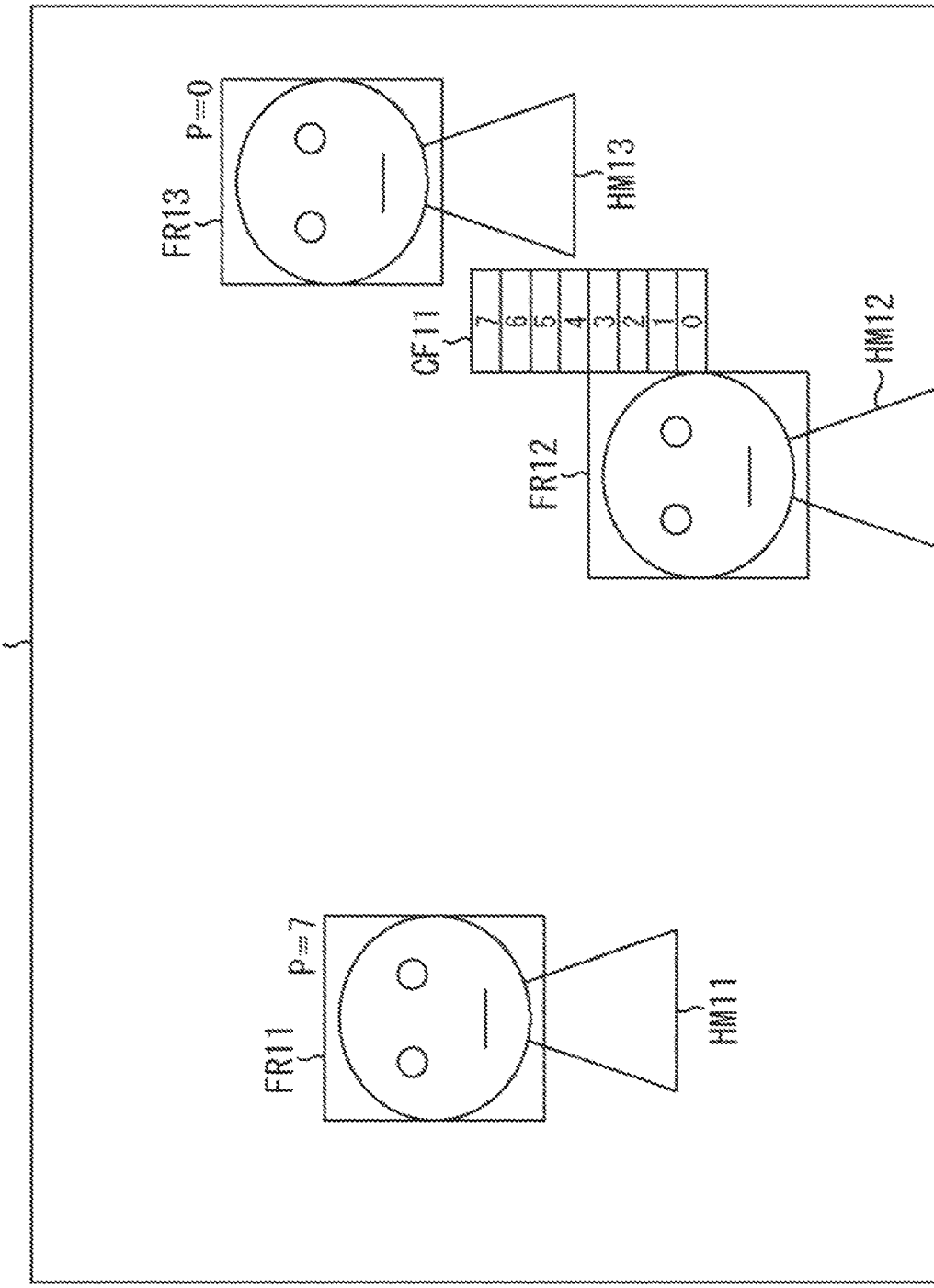
FIG. 10 A view explaining setting of the processing priority.

In the case where the processing priority is specified by the apparatus user, for example, in Step S15 of FIG. 3, as depicted in FIG. 10, the rectangular frame image is displayed together with the image of the contents on the video display portion 73. It should be noted that in FIG. 10, portions corresponding to those in case of FIG. 4 are respectively assigned the same reference numerals, and a description thereof is suitably omitted here.

FIG. 10 depicts a situation in which the apparatus user sets the processing priorities for the three persons HM11 to HM13 falling within the photographing object area.

In this example, the rectangular frame images FR11 to FR13 are highlight-displayed, and the persons HM11 to HM13 corresponding to these rectangular frame images, respectively, are selected as the audio objects.

In addition, in the vicinity of the rectangular frame image FR11 of the person HM11, character information "P=7" indicating the processing priority set for that person HM11 is displayed. Thus, it is indicated that the value of the processing priority of the person HM11 is 7 as the highest value.

Likewise, in the vicinity of the rectangular frame image FR13 of the person HM13, character information "P=0" indicating the processing priority set for that person HM13 is displayed. Thus, it is indicated that the value of the processing priority of the person HM13 is 0 as the lowest value.

Moreover, in the example of FIG. 10, in the vicinity of the rectangular frame image FR12 of the person HM12, a processing priority setting image CF11 for setting the processing priority of the person HM12 is displayed.

The processing priority setting image CF11, for example, is displayed when the apparatus user touches the portion of the rectangular frame image FR 12 with his/her finger.

Moreover, a frame in which the values of 0 to 7 of the processing priority is displayed within the processing priority setting image CF11. The apparatus user touches the frame in which the value of the desired priority is described with his/her finger, thereby enabling the processing priority of the person HM12 to be set.

For example, when the apparatus user presses the frame in which "3" is described, the person selecting portion 74 sets the value of the processing priority of the person HM12 as the audio object to "3" based on the signal supplied thereto from the touch panel 81 in response to the manipulation made by the apparatus user.

It should be noted that the method of determining the processing priority is by no means limited to the method described above, and thus any method may be adopted. For example, a simple method may be adopted such that the processing priority of the person corresponding to the rectangular frame image which is selected by the apparatus user is set to 7, and the processing priority of the person for whom the rectangular frame image is not selected is set to 0.

In addition, in the case where, for example, all the persons detected by the face recognition are selected as the audio objects, or the like, the processing priority of the person (video object) other than the persons who are selected as the audio objects in Step S14 of the encoding processing may be selected from the values each equal to or smaller than 6 in response to the size of the face on the image of the person concerned, that is, the size of the rectangular frame image.

In the encoding processing, in Step S16, the person selecting portion 74 produces the object position information associated with the audio object in response to the manipulation made by the apparatus user, and determines the processing priorities of the respective audio objects. In a word, the object position information and the processing priority are produced as the metadata of the audio object.

Then, the person selecting portion 74 supplies the object position information to the sound source separating portion 27, and supplies the object position information and the information associated with the processing priority to the audio encoding portion 28.

Moreover, in Step S18, the audio encoding portion 28 encodes the object position information, the processing priority, the audio object signal, and the background sound signal to produce the audio bit stream.

By producing the processing priority of the audio object in the manner as described above, in the apparatus in the reproduction side, the processing or the like for the audio object can be automatically changed in response to its calculation throughput or the like. As a result, for example, the suitable contents reproduction such as the real-time reproduction of the contents can be realized.

Third Embodiment

<With Respect to Spread Information>

In addition, in rendering the audio object, the point sound source is regarded as being present in a position indicated by the object position information, and under this condition, the rendering is carried out by the VBAP.

However, it is more natural that actually, the object has the size, and the sound is regarded as being generated from the surface having a certain given area. Then, there is proposed a technique with which data called spread (hereinafter referred to as spread information) are added to the metadata, and by using that data at the time of the rendering, a situation is obtained as if the sound is generated from the area in which the object is present, in a word, from the surface. This technique is adopted in the standard as well of reference literary document 2.

In a third embodiment to which the present technique is applied, in recognizing the video object such as the face of the person, the size of the rectangular frame as the recognition result of the video object is used, thereby enabling the spread information to be automatically set on the side of the video-audio processing apparatus 61.

In this case, the person selecting portion 74 selects the person desired to be made the audio object based on the signal, responding to the manipulation made by the apparatus user, which is supplied thereto from the touch panel 81, and sets the spread information. Then, the person selecting portion 74 supplies the object position information to each of the sound source separating portion 27 and the audio encoding portion 28, and supplies the resulting spread information to the audio encoding portion 28. It should be noted that similarly to the case of the second embodiment, the person selecting portion 74 may further be caused to produce the processing priority as well.

For example, in the case where the information associated with the processing priority and the spread information are included together with the object position information in the metadata, the metadata becomes a state as depicted in FIG. 11. FIG. 11 is a diagram depicting an example of syntax of the metadata.

In addition to the pieces of information included in the metadata depicted in FIG. 9, the i-th audio object, in a word, the spread information "spread[i]" of the audio object signal is further included in the metadata depicted in FIG. 11.

In this example, the spread information spread[i] is set as data of 8 bits, and is set as angle information indicating an area of the audio object on the space, in a word, angle information indicating the spread state of an area of the audio object.

A reproduction apparatus as an apparatus, on a reproduction side, for receiving the output bit stream carries out the rendering by the using such spread information spread[i]. It should be noted that a method of concretely calculating the spread information spread[i] will be described later.

Figure 12:
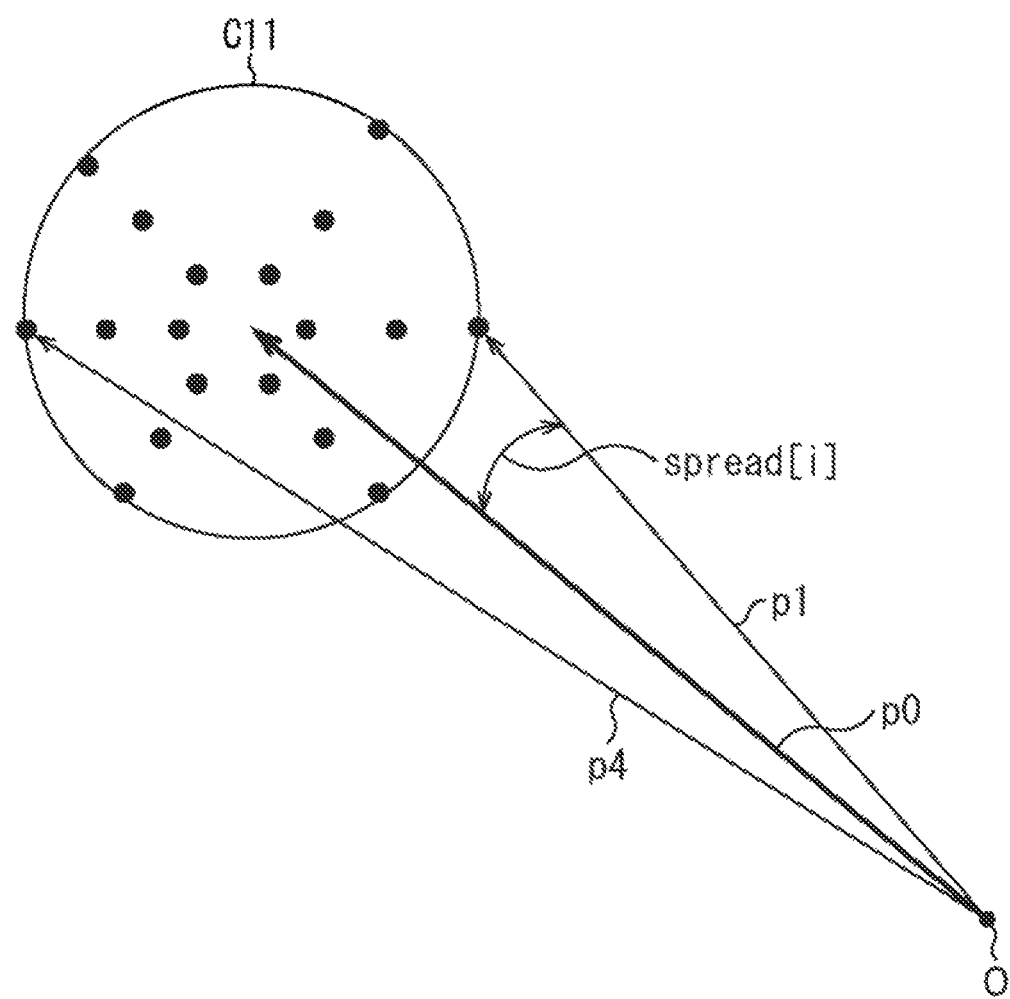
FIG. 12 A view explaining calculation of spread information.

Here, a method of utilizing the spread information in the reproduction apparatus in conformity to the standard of reference literary document 2 is described with reference to FIG. 12.

It is assumed that, for example, with regard to the origin O on the space, the audio object is located in a position indicated by a vector p0. Here, the vector p0 is a vector with the origin O as a starting point, and the position indicated by the vector p0 is a position indicated by the object position information. In addition, thereafter, a position indicated by the vector p0 will be referred to as a position p0 as well.

In such a case, the person selecting portion 74 produces the angle information for the vector p0 as the spread information spread [i].

In the reproduction apparatus, 18 vectors p1 to p18 in which when viewing the position p0 from the origin O at the front, positions within a circle C11 obtained based on the angle given by the spread information spread [i] are set as end points, and the origin O is set as the starting point are obtained in the form of spread vectors.

The circle C11 is a circle with the position p0 as the center, and in this example, the vector p1 or the vector p4 becomes a vector with a position on a circumference of the circle C11 as the end point. It should be noted that in FIG. 12, each point within the circle C11 represents an end position of each of the spread vectors.

For example, an angle between the vector p1 with the position on the circumference of the circle C11 as the end point, and the vector p0 becomes an angle indicated by the spread information spread [i].

It should be noted that since a method of calculating the vectors p1 to p18 as the spread vectors based on the object position information and the spread information spread [i], for example, is described in detail in reference literary document 2, a description thereof is omitted here.

When the spread vectors are obtained, the reproduction apparatus obtains gains of the audio object signals very speaker by VBAP with respect to the vectors p1 to p18 obtained as the spread vectors, and normalizes these gains. Then, the audio object signal multiplied by the normalized gain is mapped on the speaker to reproduce the voice of the contents.

The rendering is carried out by using the spread information in such a manner, resulting in that the audio object having the spread in the space direction can be expressed.

Figure 13:
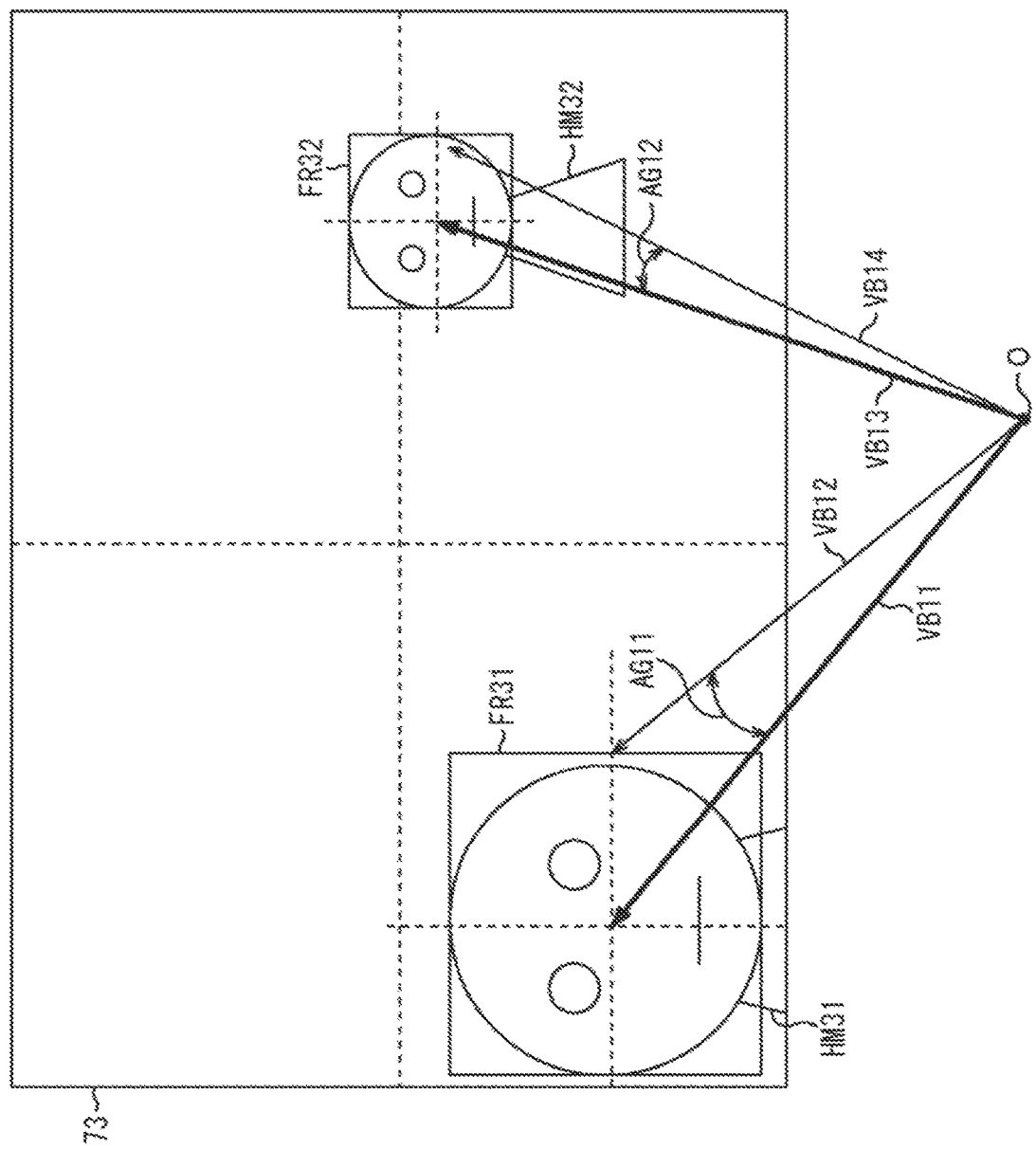
FIG. 13 A view explaining calculation of the spread information.

In the case where the spread information is calculated in the person selecting portion 74 of the video-audio processing apparatus 61, the person selecting portion 74, for example, as depicted in FIG. 13, calculates the spread information by using the rectangular frame image obtained from the recognition result of the video object by the face recognition, more specifically, from the result of the face recognition.

In the example depicted in FIG. 13, two persons HM31 and HM32 are detected from the image of the contents displayed on the video display portion 73. In addition, in the image of the contents, the rectangular frame image FR31 is superimposition-displayed on the face portion of the person HM31, and the rectangular frame image FR32 is superimposition-displayed on the face portion of the person HM32.

In particular, FIG. 13 expresses a state in which the image of the contents is projected on the space. Thus, the central position of the rectangular frame image FR31, and the central position of the rectangular frame image FR32 respectively become the positions indicated by the object position information of the corresponding audio objects.

When the person selecting portion 74, in Step S16 of FIG. 3, produces the object position information and the information associated with the processing priority with respect to the audio objects, the person selecting portion 74 further produces the spread information as well of the audio objects. That is to say, the object position information, the information associated with the processing priority, and the spread information are produced as the metadata of the audio object.

Specifically, when, for example, a description is given with respect to the person HM31 as the audio object, the person selecting portion 74 obtains a vector VB11 with the origin O on the space as the starting point, and with the position indicated by the object position information, in a word, the central position of the rectangular frame image FR31 as the end point. Then, the person selecting portion 74 sets the vector VB11 obtained in such a manner as the vector p0 described with reference to FIG. 12. Such a vector VB11 can be obtained from the object position information produced with respect to the person MH31.

In addition, the person selecting portion 74 obtains the vector VB12. In the vector VB12, the starting point is the origin O on the space, and the end point is the position a height in the longitudinal direction (Z-axis direction) of which is the same in the figure as that of the central position of the rectangular frame image FR31 on a side on the right-hand side in the figure of the rectangular frame image FR31. The vector VB12 is set as the vector p1 described with reference to FIG. 12.

Here, the end point position of the vector VB12 on the space, for example, can be obtained by using the object position information produced with respect to the person HM31, the rectangular frame image FR31, a relationship between the imaging surface 101 and the image of the contents, the focal length D, the subject distance d, and the like.

Moreover, the person selecting portion 74 calculates an angle AG11 between the vector VB11 as the vector p0 obtained in such a manner, and the vector VB12 as the vector p1 in the form of the spread information spread[i] with respect to the person HM31. More specifically, the person selecting portion 74 calculates the spread information spread [i] by calculating following Expression (9).

[Expression 9]

$$\text{spread}[i] = \cos^{-1} \frac{p0 \cdot p1}{|p0||p1|} \quad (9)$$

It should be noted that in Expression (9), p0 and p1 indicate the vector p0 and the vector p1, respectively.

Likewise, the person selecting portion 74 obtains a vector VB13 with the origin O on the space as a starting point, and with the position indicated by the object position information with respect to the person HM32, in a word, the central position of the rectangular frame image FR32 as an end point, and sets the resulting vector VB13 as the vector p0.

In addition, the person selecting portion 74 obtains a vector VB14. In the vector VB14, the starting point is the origin O on the space, and a position a height in the longitudinal direction of which is the same in the figure as that of the central position of the rectangular frame image FR32 on a side of the right-hand side in the figure of the rectangular frame image FR32 is an end point. The resulting vector VB13 is set as the vector p1.

Then, the person selecting portion 74 obtains an angle AG12 between the vector VB13 and the vector VB14 by calculating Expression (9), and sets the resulting angle AG12 as the spread information spread [i] with respect to the person HM32.

It should be noted that a description has been given with respect to the method of calculating the spread information by using only the vector p0 and the vector p1 in this case. However, when there is room in the calculation throughput or the like of the video-audio processing apparatus 61, angles between spread vectors with an upper end, a lower end, a left-hand end, and a right-hand end in the figure of the rectangular frame image as end point positions, and the vector p0 may be obtained, and an average value of these angles may be used as the spread information spread [i].

When the spread information is calculated in the manner as described above, the person selecting portion 74 supplies the object position information to the sound source the separating portion 27, and supplies the object position information, the information associated with the processing priority, and the spread information to the audio encoding portion 28.

Moreover, in Step S18, the audio encoding portion 28 encodes the object position information, the information associated with the processing priority, and the spread information, the audio object signal, and the background sound signal to produce the audio bit stream.

The spread information of the audio object is produced in the manner as described above, resulting in that the apparatus on the reproduction side can carry out the reproduction of the contents expressing the spatial spread of the audio object without specifying the spread information by the apparatus user.

Now, the series of processing described above can be executed by hardware, or can be executed by software. In the case where the series of processing are executed by the software, a program composing the software is installed in a computer. Here, the computer includes a computer incorporated in a dedicated hardware, for example, a general-purpose personal computer which can carry out various kinds of functions by installing various kinds of programs, and the like.

FIG. 14 is a block diagram depicting an example of a configuration of hardware of a computer which executes the series of processing described above in accordance with a program.

In a computer, a Central Processing Unit (CPU) 501, a Read Only Memory (ROM) 502, and a Random Access Memory (RAM) 503 are connected to one another through a bus 504.

An I/O interface 505 is further connected to the bus 504. An input portion 506, an output portion 507, a recording portion 508, a communication portion 509, and a drive 510 are connected to the I/O interface 505.

The input portion 506 includes a keyboard, a mouse, a microphone, an image pickup element or the like. The output portion 507 includes a display, a speaker or the like. The recording portion 508 includes a hard disc, a non-volatile memory or the like. The communication portion 509 includes a network interface. The drive 510 drives a removable recording media 511 such as a magnetic disc, an optical disc, a magneto-optical disc or a semiconductor memory.

In the computer configured in the manner as described above, the CPU 501, for example, loads a program stored in the recording portion 508 into the RAM 503 through the I/O interface 505 and the bus 504, and executes the program, thereby executing the series of processing described above.

The program which is to be executed by the computer (CPU 501), for example, can be recorded in the removable recording media 511 as a package media or the like to be provided. In addition, the program can be provided through a wired or wireless transmission media such as a local area network, the Internet, or digital satellite broadcasting.

In the computer, the drive 510 is equipped with the removable recording media 511, thereby enabling the program to be installed in the recording portion 508 through the I/O interface 505. In addition, the program can be received at the communication portion 509 and can be installed in the recording portion 508 through a wired or wireless transmission media. Otherwise, the program can be previously installed in the ROM 502 or the recording portion 508.

It should be noted that the program which is to be executed by the computer may be a program in accordance with which the pieces of processing are executed along the order described in the present description, or may be a program in accordance with which the pieces of processing are executed in parallel to one another or at a necessary timing when a call is made, or the like.

In addition, the embodiments of the present technique are by no means limited to the embodiments described above, and various changes can be made without departing from the subject matter of the present technique.

For example, the present technique can adopt a configuration of cloud computing in which a plurality of apparatuses shares one function to process the same in associated with one another through a network.

In addition, Steps described in the flow chart described above can be not only executed by one apparatus, but also executed so as to be shared among a plurality of apparatuses.

Moreover, in the case where a plurality of processing is included in one step, the plurality of processing can be not only executed by one apparatus, but also executed so as to be shared among a plurality of apparatuses.

Furthermore, the present technique can also adopt the following constitutions.

(1) A video-audio processing apparatus, including:
a display control portion configured to cause a video object based on a video signal to be displayed;
an object selecting portion configured to select the predetermined video object from the one video object or among a plurality of the video objects; and
an extraction portion configured to extract an audio signal of the video object selected by the object selecting portion as an audio object signal.

(2) The video-audio processing apparatus according to (1), in which the extraction portion extracts the audio object signal from the audio signal.

(3) The video-audio processing apparatus according to (2), in which the extraction portion extracts a signal other than the audio object signal of the selected video object as a background sound signal from the audio signal.

(4) The video-audio processing apparatus according to any one of (1) to (3), in which the object selecting portion produces object position information indicating a position, on a space, of the selected video object, and the extraction portion extracts the audio object signal based on the object position information.

(5) The video-audio processing apparatus according to (4), in which the extraction portion extracts the audio object signal through sound source separation using the object position information.

(6) The video-audio processing apparatus according to (5), in which the extraction portion carries out fixed beam forming as the sound source separation.

(7) The video-audio processing apparatus according to any one of (1) to (6), further including a video object recognizing portion configured to recognize the video object based on the video signal,
in which the display control portion causes an image based on a recognition result of the video object recognition result to be displayed together with the video object.

(8) The video-audio processing apparatus according to (7), in which the video object recognizing portion recognizes the video object from face recognition.

(9) The video-audio processing apparatus according to (7) or (8), in which the display control portion causes a frame to be displayed as the image in an area of the video object.

(10) The video-audio processing apparatus according to any one of (1) to (9), in which the object selecting portion selects the video object in response to a selection manipulation by a user.

(11) The video-audio processing apparatus according to any one of (1) to (10), in which the object selecting portion produces metadata of the selected video object.

(12) The video-audio processing apparatus according to (11), in which the object selecting portion produces object position information indicating a position, on a space, of the selected video object as the metadata.

(13) The video-audio processing apparatus according to (11) or (12), in which the object selecting portion produces processing priority of the selected video object as the metadata.

(14) The video-audio processing apparatus according to any one of (11) to (13), in which the object selecting portion produces spread information indicating a spread state of an area of the selected video object as the metadata.

(15) The video-audio processing apparatus according to any one of (11) to (14), further including an audio encoding portion configured to encode the audio object signal and the metadata.

(16) The video-audio processing apparatus according to (15), further including:

a video encoding portion configured to encode the video signal; and a multiplexing portion configured to multiplex a video bit stream obtained by encoding the video signal, and an audio bit stream obtained by encoding the audio object signal and the metadata.

(17) The video-audio processing apparatus according to (1) to (16), further including an image pickup portion configured to obtain the video signal by carrying out photographing.

(18) The video-audio processing apparatus according to (1) to (17), further including a sound acquisition portion configured to obtain the audio signal by carrying out sound acquisition.

(19) A video-audio processing method, including:

a display control step of causing a video object based on a video signal to be displayed;

an object selection step of selecting the predetermined video object from the one video object or among a plurality of the video objects; and an extraction step of extracting an audio signal of the video object selected by the object selection step as an audio object signal.

(20) A program in accordance with which a computer executes processing including:

a display control step of causing a video object based on a video signal to be displayed;

an object selection step of selecting the predetermined video object from the one video object or among a plurality of the video objects; and an extraction step of extracting an audio signal of the video object selected by the object selection step as an audio object signal.

REFERENCE SIGNS LIST

11 Video-audio processing apparatus
22 Video object recognizing portion
23 Video object recognition result display control portion
24 Video display portion
25 Object selecting portion
26 Sound acquisition portion
27 Sound source separating portion
28 Audio encoding portion
71 Face recognizing portion
72 Face recognition result display control portion
73 Image displaying portion
74 Person selecting portion
81 Touch panel

The invention claimed is:

1. A video-audio processing apparatus, comprising:
processing circuitry configured to:
cause one or more video objects, based on a video signal, to be displayed in an image;
select a video object from the one or more video objects in the displayed image in response to a selection by a user;
extract an audio object signal of the selected video object from an audio signal; and
set a processing priority corresponding to the selected video object of the one or more video objects, the processing priority indicating a priority with which the selected video object is processed, wherein the processing priority is set in response to user manipulation of a processing priority setting image located on the displayed image in the vicinity of the selected video object.

2. The video-audio processing apparatus according to claim 1, wherein
the processing circuitry is configured to extract a signal other than the audio object signal of the selected video object as a background sound signal from the audio signal.

3. The video-audio processing apparatus according to claim 1, wherein
the processing circuitry is configured to produce object position information indicating a position, on a space, of the selected video object, and to extract the audio object signal based on the object position information.

4. The video-audio processing apparatus according to claim 3, wherein
the processing circuitry is configured to extract the audio object signal through sound source separation using the object position information.

5. The video-audio processing apparatus according to claim 4, wherein
the processing circuitry is configured to carry out fixed beam forming as the sound source separation.

6. The video-audio processing apparatus according to claim 1, wherein the processing circuitry is further configured to recognize the video object based on the video signal, and to cause an image based on a recognition result of the video object to be displayed together with the video object.

7. The video-audio processing apparatus according to claim 6, wherein
the processing circuitry is configured to recognize the video object from face recognition.

8. The video-audio processing apparatus according to claim 6, wherein
the processing circuitry is configured to cause a frame to be displayed as the image in an area of the video object.

9. The video-audio processing apparatus according to claim 1, wherein
the processing circuitry is configured to produce metadata of the selected video object.

10. The video-audio processing apparatus according to claim 9, wherein
the processing circuitry is configured to produce object position information indicating a position, on a space, of the selected video object as the metadata.

11. The video-audio processing apparatus according to claim 9, wherein
the processing circuitry is configured to set the processing priority of the selected video object as the metadata.

12. The video-audio processing apparatus according to claim 9, wherein
the processing circuitry is configured to produce spread information indicating a size of the selected video object as the metadata.

13. The video-audio processing apparatus according to claim 9, wherein the processing circuitry is further configured to encode the audio object signal and the metadata.

14. The video-audio processing apparatus according to claim 13, wherein the processing circuitry is further configured to encode the video signal, and to multiplex a video bit stream obtained by encoding the video signal, and an audio bit stream obtained by encoding the audio object signal and the metadata.

15. The video-audio processing apparatus according to claim 1, further comprising an image pickup device configured to obtain the video signal by carrying out photographing.

16. The video-audio processing apparatus according to claim 1, further comprising a sound acquisition device configured to obtain the audio signal by carrying out sound acquisition.

17. A video-audio processing method executed by processing circuitry, the method comprising:
    causing one or more video objects, based on a video signal, to be displayed in an image;
    selecting a video object from the one or more video objects in the displayed image in response to a selection by a user;
    extracting an audio object signal of the selected video object from an audio signal; and
    setting a processing priority corresponding to the selected video object of the one or more video objects, the processing priority indicating a priority with which the selected video object is processed, wherein the processing priority is set in response to user manipulation of a processing priority setting image located on the displayed image in the vicinity of the selected video object.

18. A non-transitory computer readable medium containing instructions that, when executed by processing circuitry, perform a video-audio processing method comprising:
    causing one or more video objects, based on a video signal, to be displayed in an image;
    selecting a video object from the one or more video objects in the displayed image in response to a selection by a user;
    extracting an audio object signal of the selected video object from an audio signal; and
    setting a processing priority corresponding to the selected video object of the one or more video objects, the processing priority indicating a priority with which the selected video object is processed, wherein the processing priority is set in response to user manipulation of a processing priority setting image located on the displayed image in the vicinity of the selected video object.

* * * * *